United States Patent
Malone

(10) Patent No.: US 11,477,943 B2
(45) Date of Patent: Oct. 25, 2022

(54) BALE TRANSPORTER AND A METHOD FOR TRANSPORTING BALES

(71) Applicant: MALONE FARM MACHINERY LIMITED, County Mayo (IE)

(72) Inventor: Michael Frederick Malone, Claremorris (IE)

(73) Assignee: MALONE FARM MACHINERY LIMITED, County Mayo (IE)

( * ) Notice: Subject to any disclaimer, the term of this patent is extended or adjusted under 35 U.S.C. 154(b) by 0 days.

(21) Appl. No.: 17/053,904

(22) PCT Filed: May 10, 2019

(86) PCT No.: PCT/IE2019/000005
§ 371 (c)(1),
(2) Date: Nov. 9, 2020

(87) PCT Pub. No.: WO2019/215712
PCT Pub. Date: Nov. 14, 2019

(65) Prior Publication Data
US 2021/0298240 A1 Sep. 30, 2021

(30) Foreign Application Priority Data
May 10, 2018 (IE) .................................. 2018/0145

(51) Int. Cl.
*A01D 90/08* (2006.01)
*B60P 3/00* (2006.01)
(52) U.S. Cl.
CPC .............. *A01D 90/083* (2013.01); *B60P 3/00* (2013.01)
(58) Field of Classification Search
CPC .. B60P 1/6472; B60P 1/02; B60P 3/08; B60P 3/00; A01D 87/127; A01D 87/122; A01D 90/083; A01D 90/02
(Continued)

(56) References Cited

U.S. PATENT DOCUMENTS 3,952,881 A * 4/1976 Knudson ................. A01D 90/08
                                                        414/791.5
4,204,790 A * 5/1980 Baxter .................. A01D 90/083
                                                         280/43.23
(Continued)

FOREIGN PATENT DOCUMENTS

CA         2126531 A1 * 12/1995 ............ B60P 1/6472
DE   20 2016 100 132 U1    1/2016
(Continued)

OTHER PUBLICATIONS

International Search Report for PCT/IE2019/000005 dated Aug. 21, 2019 (PCT/ISA/210).
(Continued)

*Primary Examiner* — Gregory W Adams
(74) *Attorney, Agent, or Firm* — Sughrue Mion, PLLC

(57) ABSTRACT

A bale transporter (1) for transporting four rows (3) of bales (2) comprises a chassis (5), a first framework (20) mounted on the chassis (5) for carrying a lower two of the rows (3) of bales (2), and a secondary framework (26) for carrying an upper two of rows (3) of bales (2). A pair of transfer elements (60) are pivotally coupled to the chassis (5) about respective first pivot axes (61) between a first state for picking up bales from the ground, and a second state for transferring the bales onto the main and secondary frameworks (20) and (26). The secondary framework (26) is urgeable between a first state adjacent the main framework (20) and a raised second state spaced apart above the secondary framework (26). Initially, with the secondary framework (26) in the first state, two rows (3) of bales (2) are picked up by the transfer elements (60) and transferred onto the secondary framework (26) which is then urged upwardly into the second state. The next two rows (3) of
(Continued)

Figure 1:
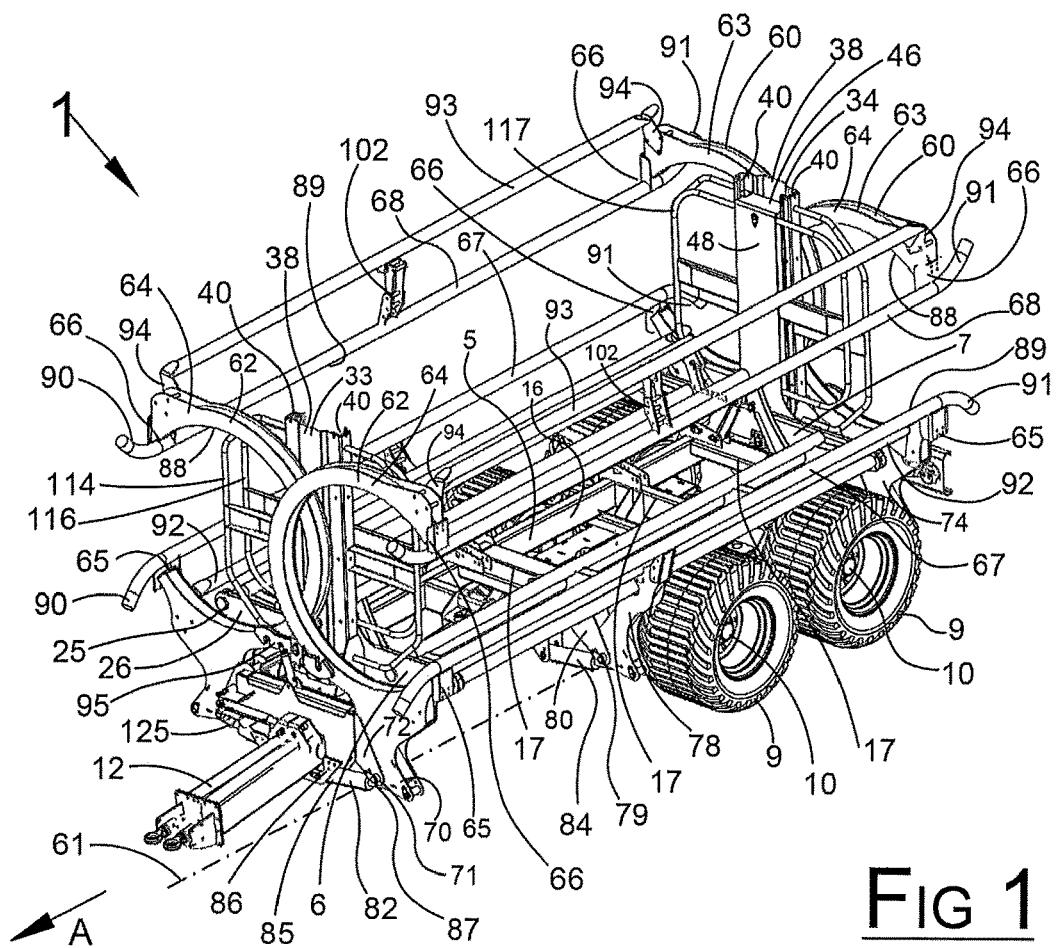

bales (2) are then picked up by the transfer elements (60) and are transferred onto the main framework (20).

18 Claims, 15 Drawing Sheets

(58) Field of Classification Search
USPC .......... 298/18; 410/47; 414/111, 24.5, 24.6, 414/468, 470, 552
See application file for complete search history.

(56) References Cited

U.S. PATENT DOCUMENTS

| | | | | |
|---|---|---|---|---|
| 4,232,986 A * | 11/1980 | Johnson | ............... | A01D 90/083 414/24.5 |
| 4,459,075 A * | 7/1984 | Eichenberger | ....... | A01D 90/083 414/24.5 |
| 5,249,903 A * | 10/1993 | Green | ............... | A01D 90/083 414/111 |
| 5,320,477 A * | 6/1994 | Druse, Sr. | ............ | A01D 90/083 414/24.5 |
| 6,478,522 B2 * | 11/2002 | Babb | ............... | A01D 90/083 298/18 |
| 6,935,827 B2 * | 8/2005 | Delaurier | ............ | A01D 90/083 414/111 |
| 8,200,363 B2 * | 6/2012 | Cook | ............... | B60P 1/02 700/214 |
| 8,506,218 B2 * | 8/2013 | Delgado Matarranz | ..... | F03D 13/20 410/44 |
| 8,523,502 B2 * | 9/2013 | Krassort | ............... | B60J 5/0497 410/117 |
| 2004/0197167 A1 | 10/2004 | Haukaas | | |
| 2005/0074311 A1 * | 4/2005 | Byrd | ............... | A01D 87/127 414/24.5 |
| 2005/0079038 A1 * | 4/2005 | Vlaanderen | ............ | B60P 1/486 414/470 |
| 2011/0014014 A1 | 1/2011 | Shoemaker | | |
| 2016/0167563 A1 | 6/2016 | Nelson et al. | | |

FOREIGN PATENT DOCUMENTS

| | | | | |
|---|---|---|---|---|
| FR | 2422525 A1 * | 11/1979 | ............... | B60P 3/00 |
| FR | 2496397 A * | 6/1982 | ........... | A01D 90/083 |
| WO | 2010/019581 A2 | 2/2010 | | |
| WO | 2017/163229 A1 | 9/2017 | | |

OTHER PUBLICATIONS

Written Opinion for PCT/IE2019/000005 dated Aug. 21, 2019 (PCT/ISA/237).

* cited by examiner

FIG 20

BALE TRANSPORTER AND A METHOD FOR TRANSPORTING BALES

CROSS REFERENCE TO RELATED APPLICATIONS

This application is a National Stage of International Application No. PCT/IE2019/000005 filed May 10, 2019, claiming priority based on Irish Patent Application No. S2018/0145 filed May 10, 2018.

The present invention relates to a bale transporter for transporting bales, and in particular, though not limited to a bale transporter for transporting bales of fodder material. The invention also relates to a method for transporting bales, and in particular, though not limited to a method for transporting bales of fodder material.

Crop materials, for example, hay, straw, silage and the like are now commonly formed into cylindrical bales commonly referred to as round bales. Such round bales in general are of diameter in the range of 1.2 metres to 1.6 metres and of axial length in the range of 1.2 metres to 1.3 metres.

Such bales when of silage fodder material are normally wrapped in plastics film material, which typically, is opaque, and commonly is of the colour black, green or white. Such round bales because of their size and weight, are difficult to handle, and in general, require mechanical means for such handling. Additionally, because of the size of such bales, conventional transporters for such bales are suitable for transporting only a limited number of such bales at one time.

U.S. Published Patent Application Specification No. 2004/0197167 of Haukaas discloses a bale transporter which comprises a chassis and a pair of pick-up elements pivotally coupled to the chassis on opposite sides thereof about respective longitudinally extending parallel spaced apart pivot axes. The pick-up elements are pivotal from a first state for picking up bales from the ground to a second state with the bale located within the pick-up elements supported on the chassis. One of the problems with this bale transporter is that the number of bales which can be transported by the bale transporter is limited.

There is therefore a need for an improved bale transporter with increased bale carrying capacity.

The present invention is directed towards providing such a bale transporter, and the invention is also directed towards providing a method for transporting bales.

According to the invention there is provided a bale transporter comprising a chassis extending between a forward end and a rearward end and defining an elongated first bale carrier, the chassis being supported on at least a pair of rotatably mounted ground engaging wheels spaced apart transversely relative to the direction of normal forward motion of the transporter, an elongated second bale carrier mounted on the chassis and moveable between a first state adjacent the first bale carrier and a second state spaced apart upwardly above the first bale carrier, and a transfer means configured to pick up bales from the ground with the bales in the transfer means in an aligned state, and to transfer the bales in the aligned state onto a selected one of the first and second bale carriers.

Preferably, the second bale carrier is configured in the second state to be spaced apart above the first bale carrier a distance for accommodating bales on the first bale carrier beneath the second bale carrier.

In one embodiment of the invention each one of the first and second bale carriers is configured for carrying at least one elongated row of the bales in the aligned state with the row of the aligned bales extending substantially parallel to the direction of normal forward motion of the transporter.

Preferably, the transfer means is configured to transfer the bales in the aligned state onto the selected one of the first and second bale carriers with the bales parallel to the direction of normal forward motion of the transporter.

Advantageously, the transfer means is configured to transfer bales onto the selected one of the first and second bale carriers with the bales in the aligned state in end-to-end abutting engagement and with a central geometrical axis of each of the bales substantially aligned with each other.

In one embodiment of the invention a support means is provided for supporting the second bale carrier in the second state.

In another embodiment of the invention a first urging means is provided for urging the second bale carrier between the first state and the second state. Preferably, the first urging means comprises at least one first ram. Advantageously, the first urging means comprises a pair of first rams.

Preferably, one of the pair of first rams is located adjacent a forward end of the chassis and the other one of the pair of first rams is located adjacent the rearward end of the chassis.

Advantageously, each first ram comprises an hydraulic ram.

In one embodiment of the invention the first urging means is configured as the support means.

In another embodiment of the invention the second bale carrier extends substantially the length of the chassis.

In a further embodiment of the invention a pair of guide means are located at respective opposite ends of the chassis for guiding the second bale carrier between the first state and the second state.

Preferably, the first bale carrier extends substantially the length of the chassis.

In one embodiment of the invention the transfer means is pivotally coupled to the chassis about a first pivot axis extending substantially parallel to the direction of normal forward motion of the transporter.

Preferably, the transfer means is urgeable between a first state for engaging and picking up bales on the ground and a second state for transferring the bales onto a selected one of the first and second bale carriers.

In one embodiment of the invention a second urging means is provided for urging the transfer means between the first and second states. Preferably, the second urging means comprises at least one second ram.

Advantageously, the second urging means comprises at least one second hydraulic ram.

In one embodiment of the invention a first retaining means is provided for retaining the transfer means in the second state. Preferably, the first retaining means comprises a retaining member pivotally mounted on the chassis, and pivotal between a retaining state for retaining the transfer means in the second state, and a release state for releasing the transfer means from the second state. Advantageously, a third urging means is provided for urging the first retaining means between the retaining and release states.

Preferably, the transfer means is pivotal between the first and second states.

In one embodiment of the invention the transfer means is configured to engage and pick up the bales on the ground as the transporter is being moved in a direction substantially parallel to the direction of normal forward motion of the transporter.

Preferably, the transfer means is configured to discharge bales located in the transfer means from the transfer means onto the selected one of the first and second bale carriers.

Advantageously, the transfer means is configured to retain the bales in the aligned state as they are being picked up from the ground.

Ideally, the transfer means is configured to retain the bales on the first bale carrier during transportation thereof.

Preferably, the transfer means is configured to retain the bales on the second bale carrier during transportation thereof.

Ideally, the transfer means is configured to retain the bales on the first and second bale carriers during transportation thereof.

In one embodiment of the invention the transfer means comprises an elongated first bale engaging member and an elongated second bale engaging member spaced apart from the first bale engaging member.

Preferably, the first and second bale engaging members extend longitudinally and substantially parallel to the direction of normal forward motion of the transporter. Advantageously, the first and second bale engaging members define a bale accommodating opening therebetween for accommodating a portion of a bale resting on the ground therebetween as the bale is being captured by the transfer means. Ideally, the first and second bale engaging members extend substantially the length of the chassis.

In one embodiment of the invention the first bale engaging member is located closer to the chassis than the second bale engaging member.

Preferably, the first and second bale engaging members are configured for retaining the bales on the first bale carrier during transporting thereof.

Advantageously, the first and second bale engaging members are carried on at least one end element located adjacent one end of the bale engaging members.

In another embodiment of the invention the first and second bale engaging members extend between a pair of spaced apart end elements, one of the end elements being located adjacent a forward end of the first and second bale engaging members, and the other one of the end elements being located adjacent a rearward end of the first and second bale engaging members.

Preferably, at least one of the end elements is configured to accommodate a bale resting on the ground therethrough. Advantageously, both of the end elements are configured to accommodate a bale resting on the ground therethrough.

In another embodiment of the invention each end element comprises an arcuate member. Preferably, the arcuate member of each end element terminates in its opposite ends in the respective first and second bale engaging members.

In another embodiment of the invention at least one first strut extends between the end elements. Preferably, the at least one first strut is located towards but spaced apart from the first bale engaging member. Advantageously, the at least one first strut extends substantially parallel to the first bale engaging member.

In another embodiment of the invention the first and second bale engaging members and the at least one first strut define a portion of the periphery of the bale.

Preferably, the at least one first strut cooperates with the first and second bale engaging members to retain the bales on the first bale carrier during transportation of the bales when the transfer means is in the second state.

Advantageously, at least one second strut is provided extending between the end elements towards the second bale engaging member but spaced apart therefrom. Preferably, the at least one second strut extends substantially parallel to the second bale engaging member. Advantageously, the second strut is configured for retaining the bales on the second bale carrier during transportation thereof when the transfer means is in the second state.

Preferably, the end elements of the transfer means are spaced apart longitudinally to accommodate discharge of the bales in the transfer means onto the selected one of the first and second bale carriers.

In one embodiment of the invention at least one guide roller is rotatably mounted on one of the end elements of the transfer means for guiding a bale into the transfer element through the end element. Preferably, a pair of the guide rollers are provided on opposite sides of at least one of the end element of the transfer means.

In another embodiment of the invention a discharge means is mounted on the chassis for discharging a bale on the first bale carrier therefrom. Preferably, the discharge means is configured for discharging a bale on the second bale carrier therefrom when the second bale carrier is in the first state.

In one embodiment of the invention the discharge means is of length just less than the length of the second bale carrier.

In another embodiment of the invention the discharge means is co-operable with the transfer means for discharging a bale from each of the first and second bale carriers.

In a further embodiment of the invention the discharge means comprises an elongated discharge member extending substantially parallel to the direction of normal forward motion of the transporter.

In another embodiment of the invention the discharge means comprises an elongated discharge cradle, the discharge cradle being configured for supporting a bale on the first bale carrier.

Preferably, the discharge means is urgeable from a rest state to a discharge state for discharging a bale from the first and second bale carriers.

Advantageously, the discharge means is configured in the rest state for supporting a bale on the first bale carrier.

Preferably, the discharge means is pivotally mounted on the chassis about a second pivot axis extending substantially parallel to the direction of normal forward motion of the transporter, and is pivotal about the second pivot axis between the rest state and the discharge state.

In one embodiment of the invention a fourth urging means is provided for urging the discharge means between the rest and the discharge states.

In another embodiment of the invention the first bale carrier is configured to carry two rows of the bales with the bales of each row in the aligned state and with the respective rows extending parallel to each other and being adjacent each other.

In another embodiment of the invention the second bale carrier is configured to carry two rows of the bales with the bales of each row in the aligned state and with the rows extending parallel to each other and being adjacent each other.

Preferably, each row of aligned bales comprises at least three bales.

In another embodiment of the invention each row of aligned bales comprises up to ten bales.

In a further embodiment of the invention a pair of transfer means are located on respective opposite sides of the chassis.

In one embodiment of the invention the transporter is configured for transporting cylindrical bales.

In another embodiment of the invention the first and second bale carriers are configured for carrying the cylindrical bales with the central geometrical axes of the respective bales of each row substantially aligned with each other and extending substantially parallel to the direction of normal forward motion of the transporter.

In a further embodiment of the invention a tow bar is coupled to the chassis and extends forwardly therefrom.

Preferably, the tow bar is urgeable from a first state extending in a generally forward direction substantially parallel to the direction of normal forward motion of the transporter for maintaining the transporter in alignment with a towing vehicle with the transporter aligned with the path of the towing vehicle, and a second state offset towards at least one side of the path of travel of the towing vehicle with the transfer means extending beyond the path of the towing vehicle.

Advantageously, a fifth urging means is provided for urging the tow bar between the first and second states. Preferably, the fifth urging means is configured for retaining the tow bar in a selected one of the first and second states. Advantageously, the fifth urging means is configured for retaining the tow bar in a selected intermediate state intermediate the first and second states thereof.

In one embodiment of the invention the tow bar is urgeable into two second states on respective opposite sides of the first state.

Preferably, the tow bar is pivotally coupled to the chassis and is pivotal between the first and second states.

The invention also provides a method for transporting bales, the method comprising providing a bale transporter with an elongated first bale carrier, and an elongated second bale carrier, the second bale carrier being moveable between a first state adjacent the first bale carrier, and a second state spaced apart upwardly above the first bale carrier, the method further comprising picking up bales from the ground by a transfer means with the bales aligned in the transfer means, with the second bale carrier in the first state transferring the aligned bales by the transfer means onto the second bale carrier with the bales aligned in an elongated row, urging the second bale carrier into the second state, and picking up further bales from the ground by the transfer means with the bales aligned in the transfer means, and transferring the aligned bales onto the first bale carrier with the bales aligned in an elongated row.

In one embodiment of the invention the bales are sequentially engaged by and picked up from the ground by the transfer means as the transporter is urged in a direction parallel to the direction of normal forward motion of the transporter.

In another embodiment of the invention the bales are sequentially engaged and picked up from the ground by the transfer means as the transfer means is being urged in a direction parallel to the direction of normal forward motion of the transporter.

Preferably, the bales are retained on the first and second bale carriers by the transfer means during transporting of the bales on the bale transporter.

In another embodiment of the invention the bales are discharged from the first bale carrier prior to discharging of the bales from the second bale carrier. Preferably, the bales are discharged from the first and second bale carriers onto the transfer means as the transfer means is being urged from the second state to the first state.

In another embodiment of the invention the bales are released from the transfer means onto the ground by disengaging the bales from the transfer means.

In another embodiment of the invention the bales are disengaged from the transfer means by moving the transfer means in a direction parallel to the direction of normal forward motion of the bale transporter.

The advantages of the invention are many. A particularly important advantage of the invention is that the bale carrying capacity of the bale transporter according to the invention is significantly improved over prior art bale transporters. In particular, the bale carrying capacity of the bale transporter according to the invention is double the capacity of bale transporters known heretofore for the same footprint.

Figure 2:
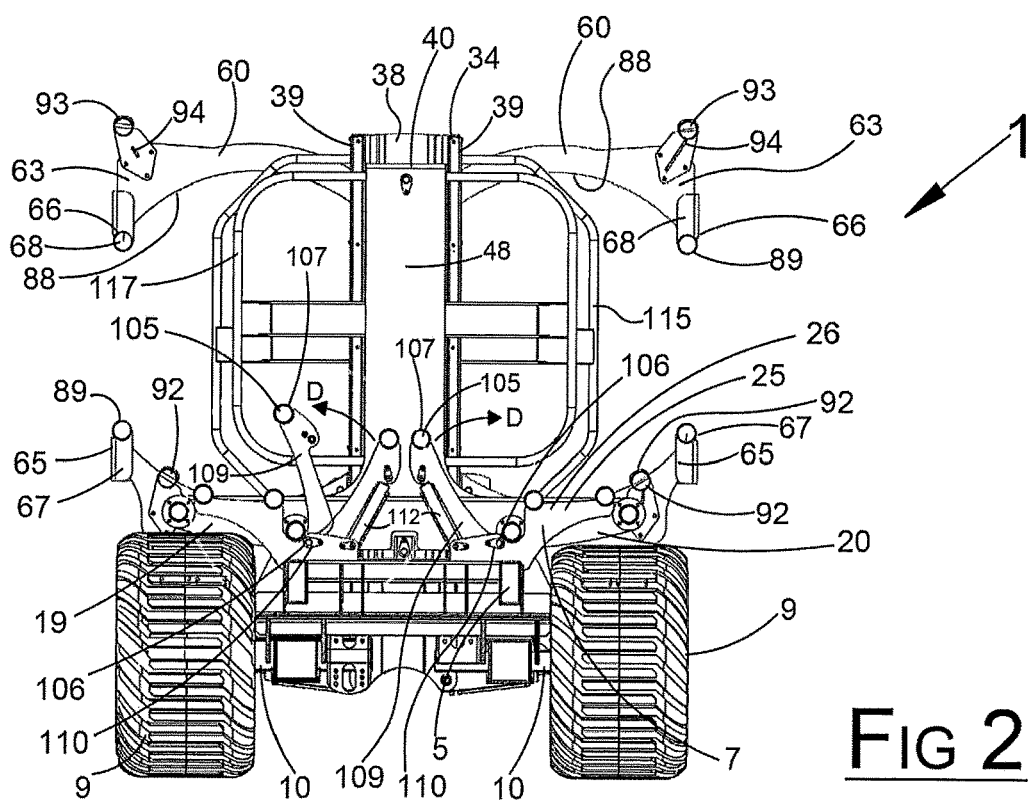
Figure 3:
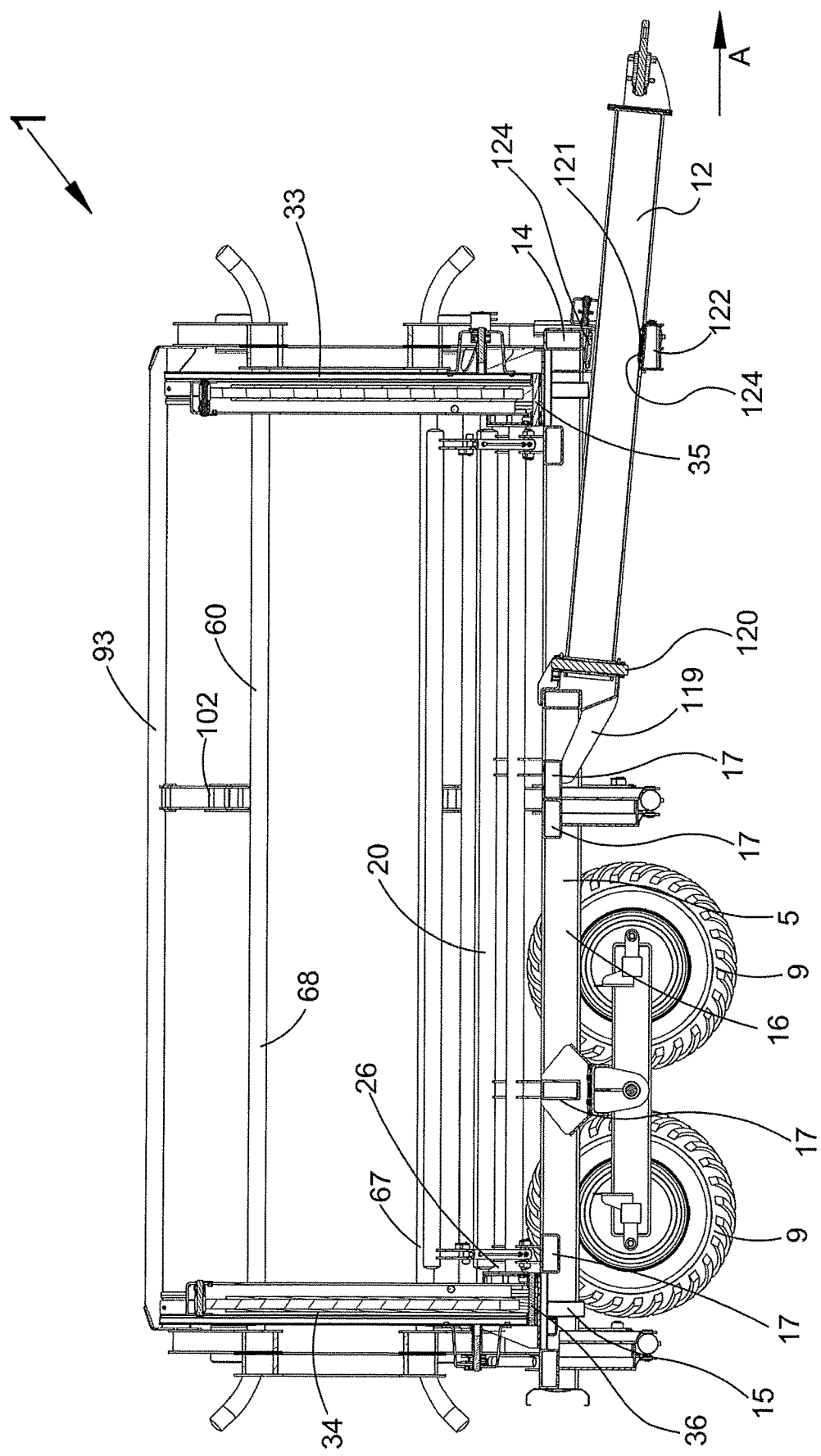
Figure 4:
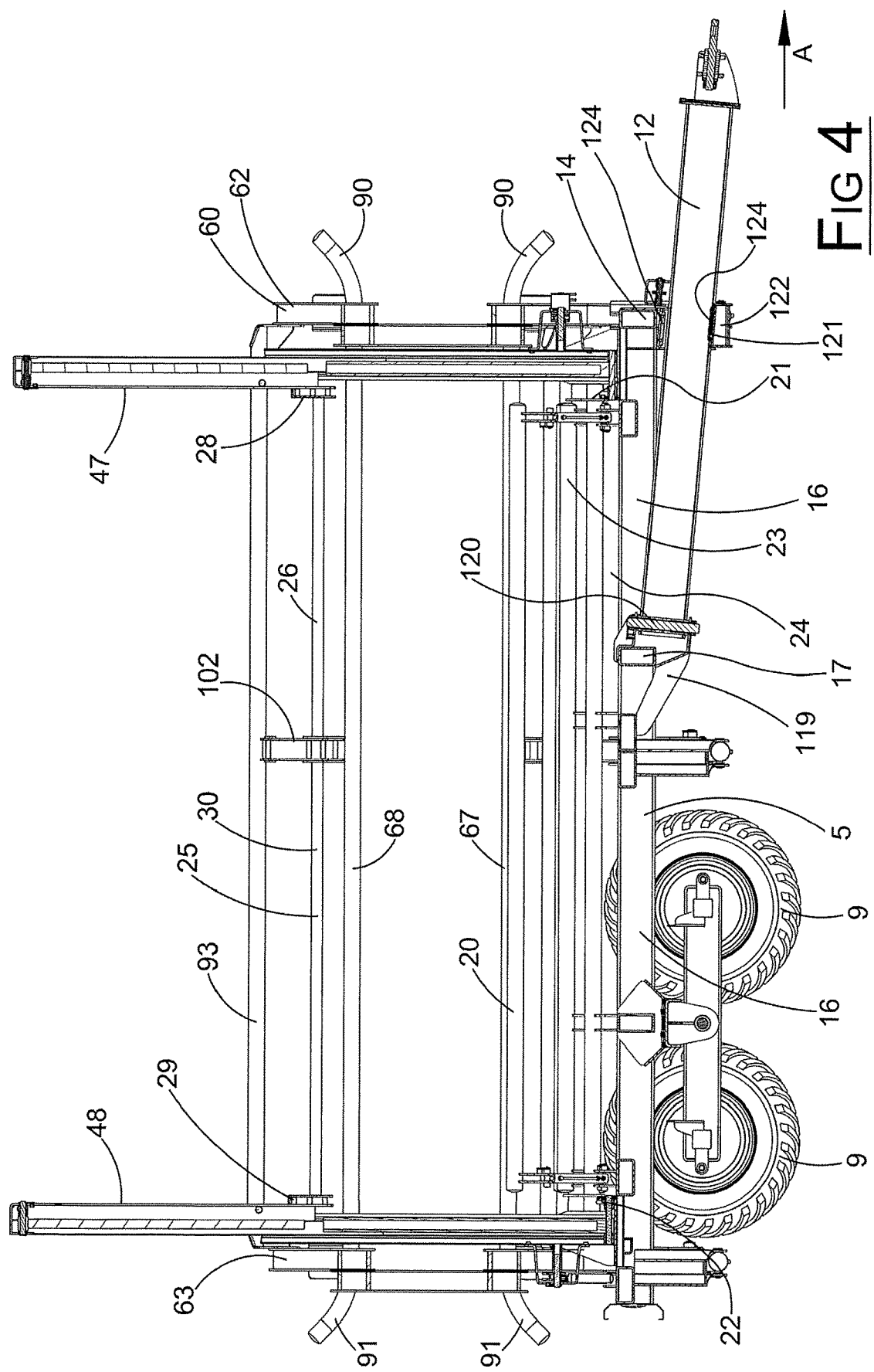
Figure 5:
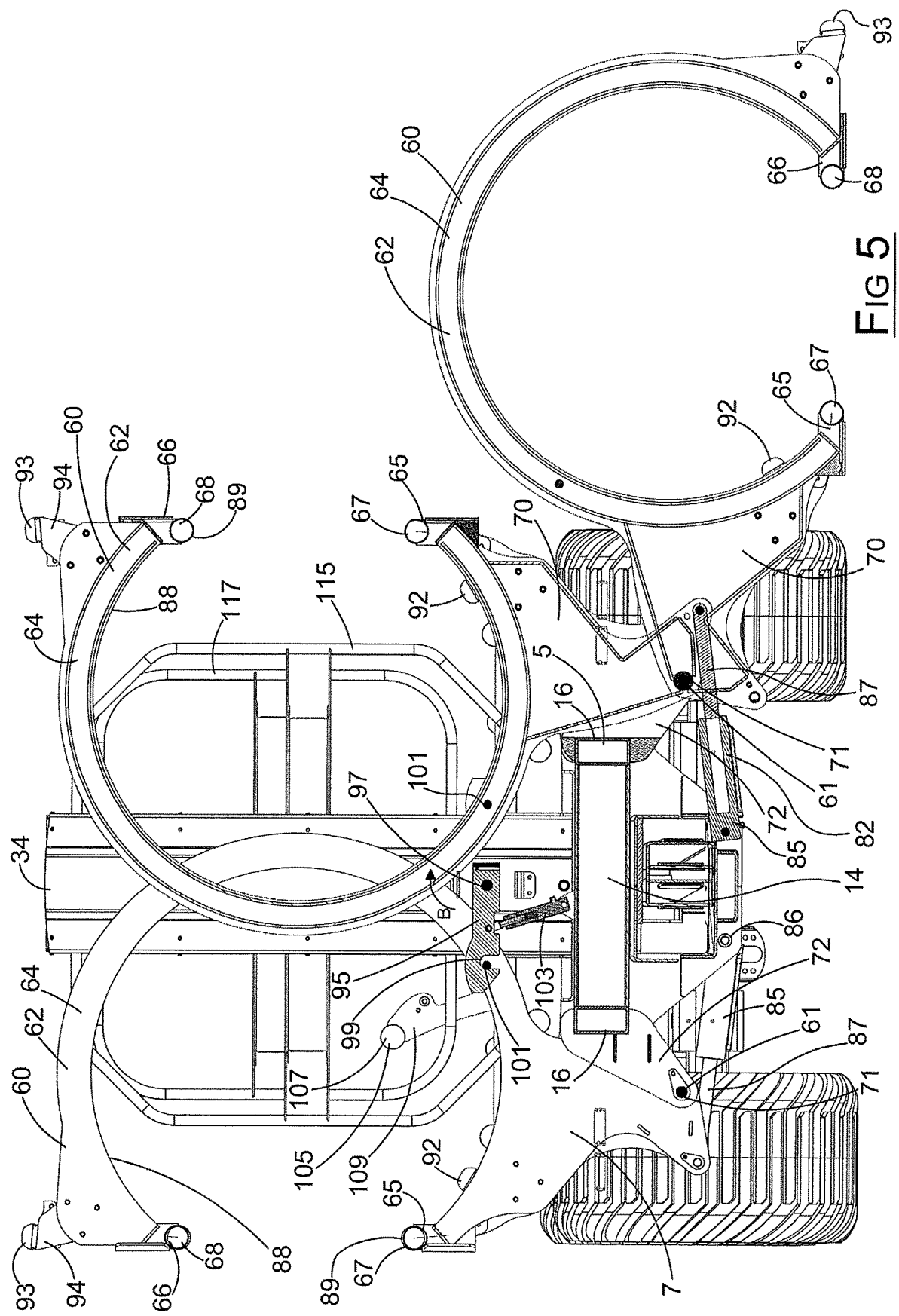
Figure 6:
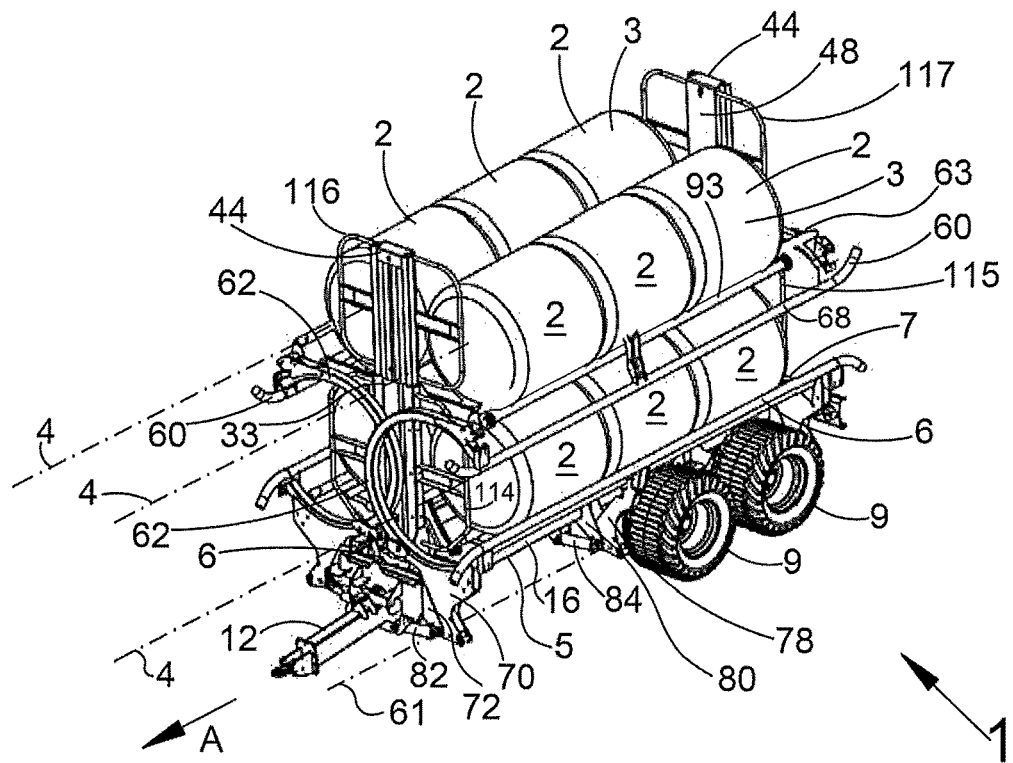
Figure 7:
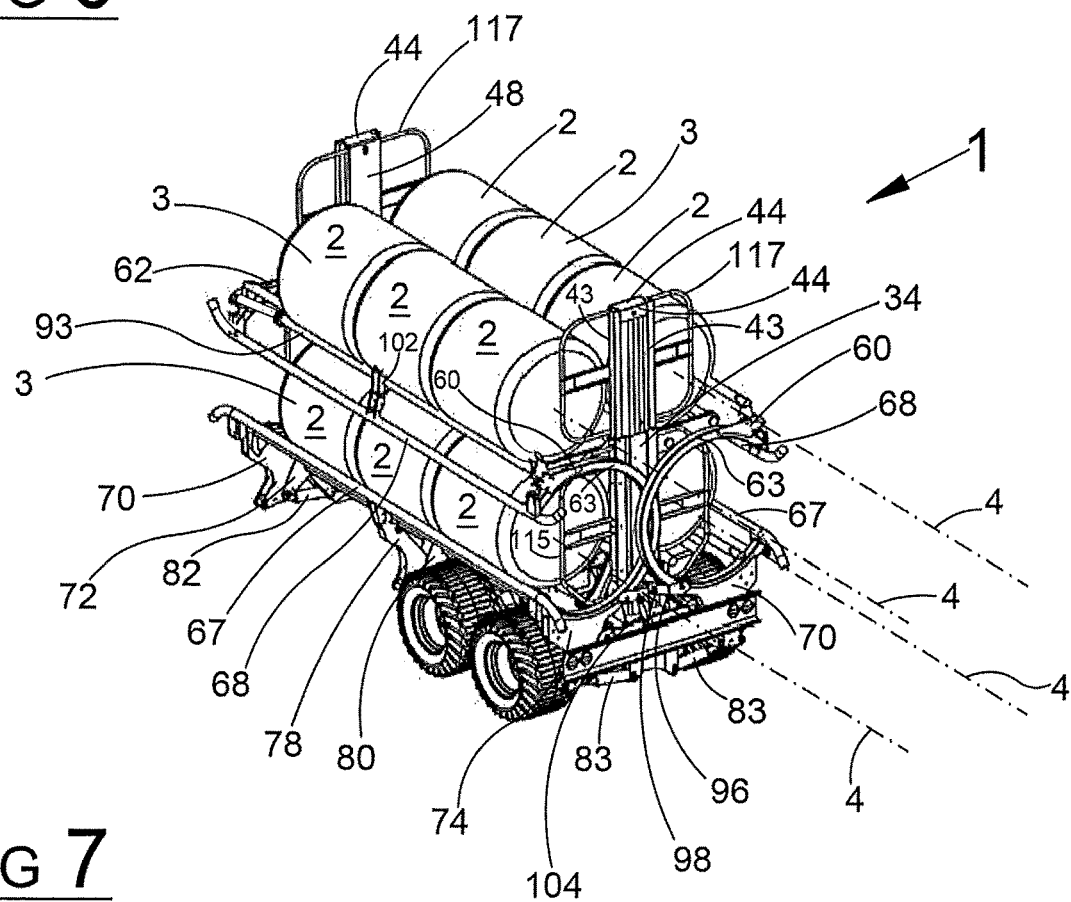
Figure 8:
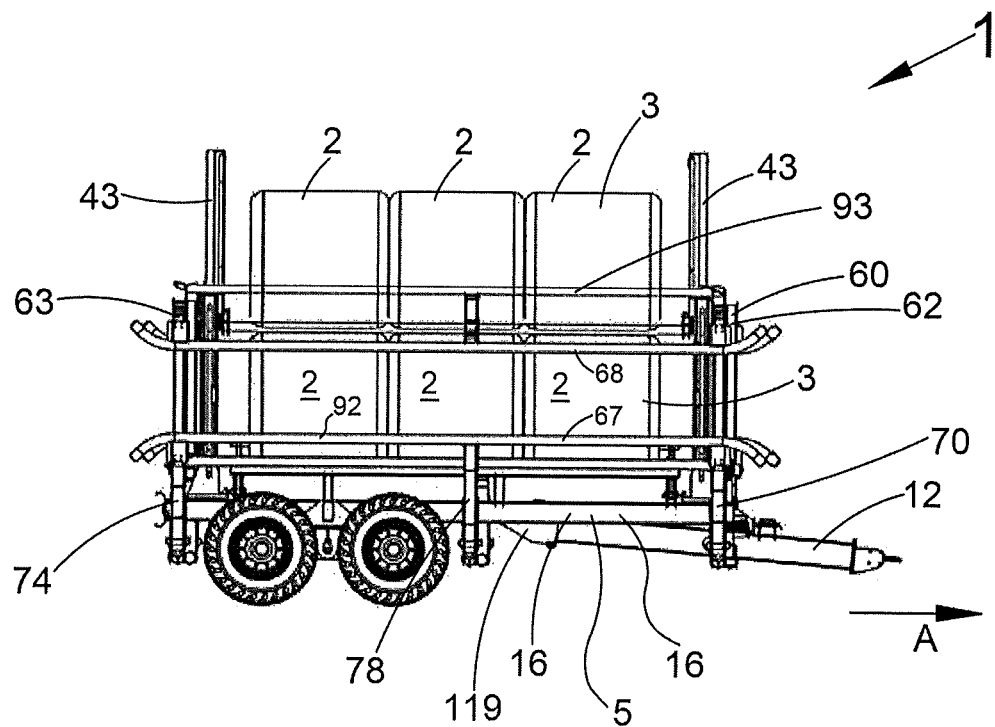
Figure 9:
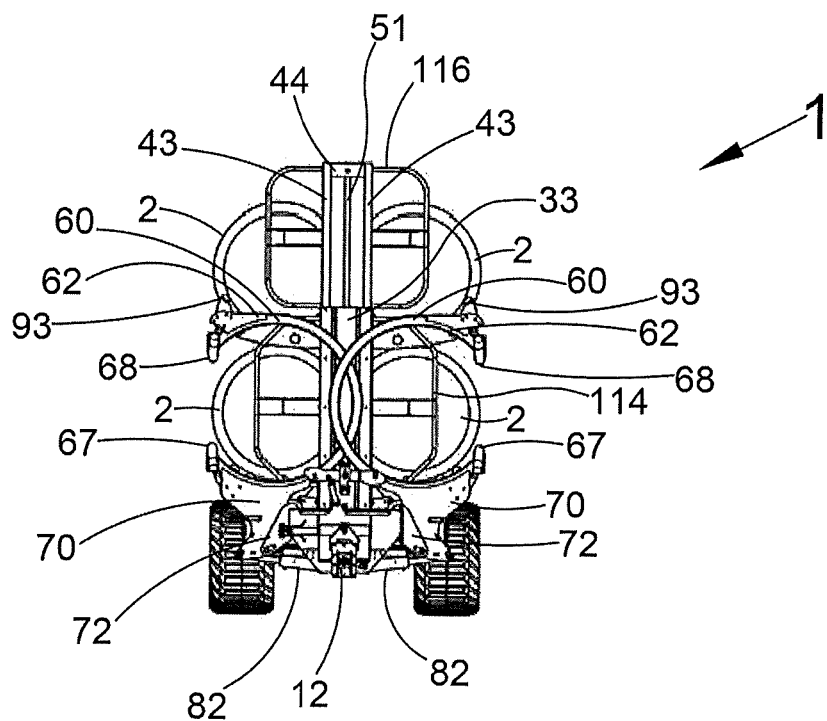
Figure 11:
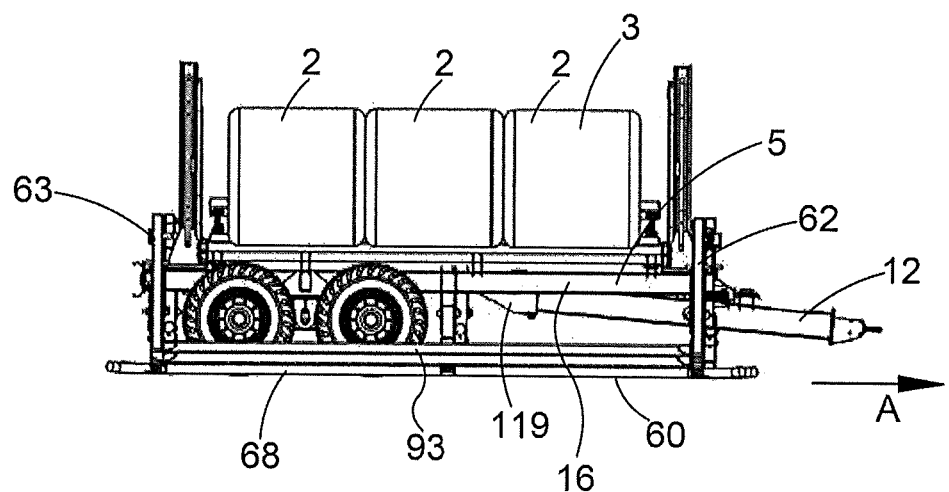
Figure 10:
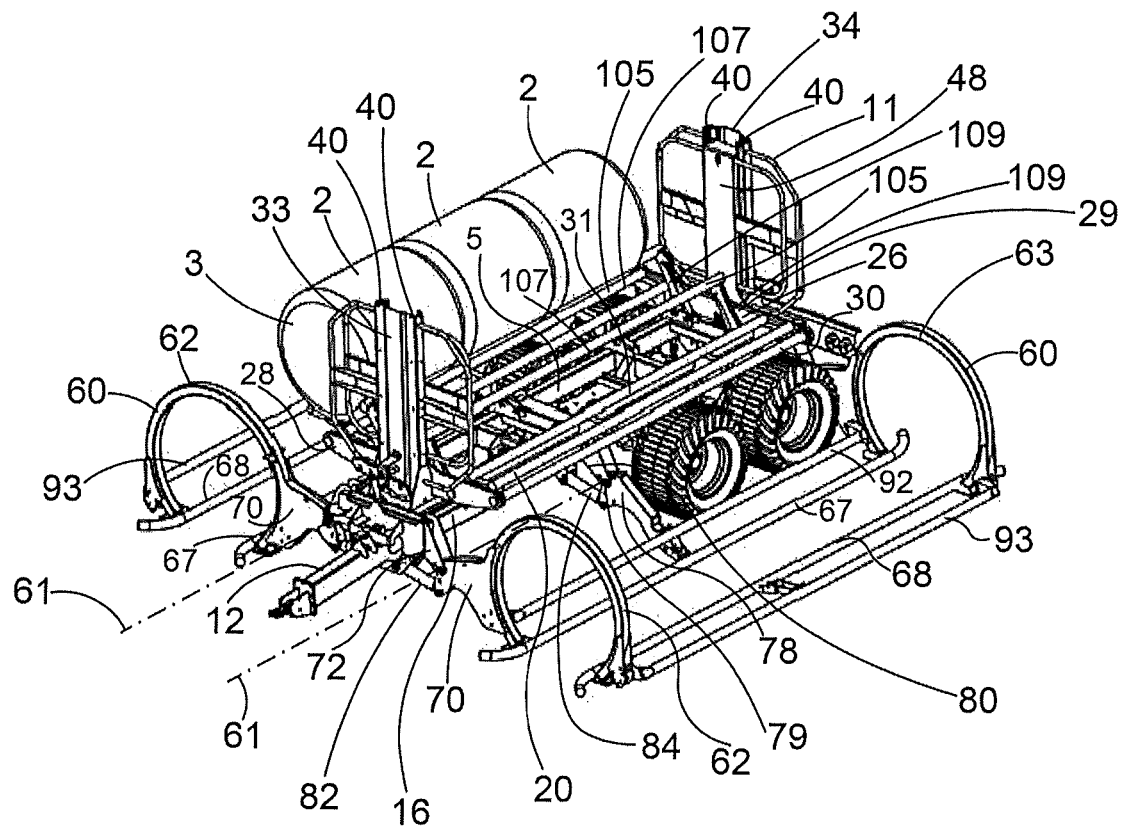
Figure 12:
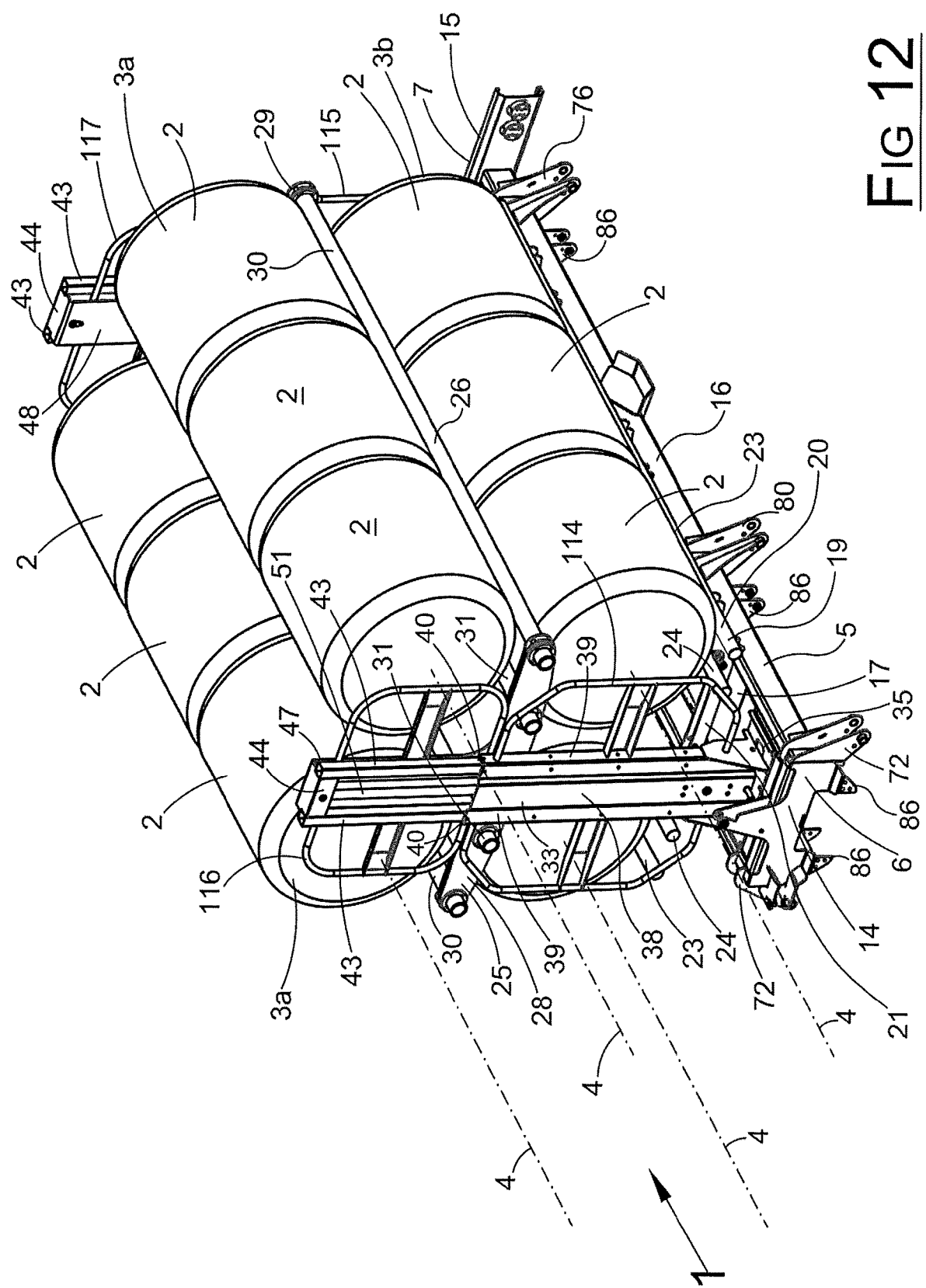
Figure 13:
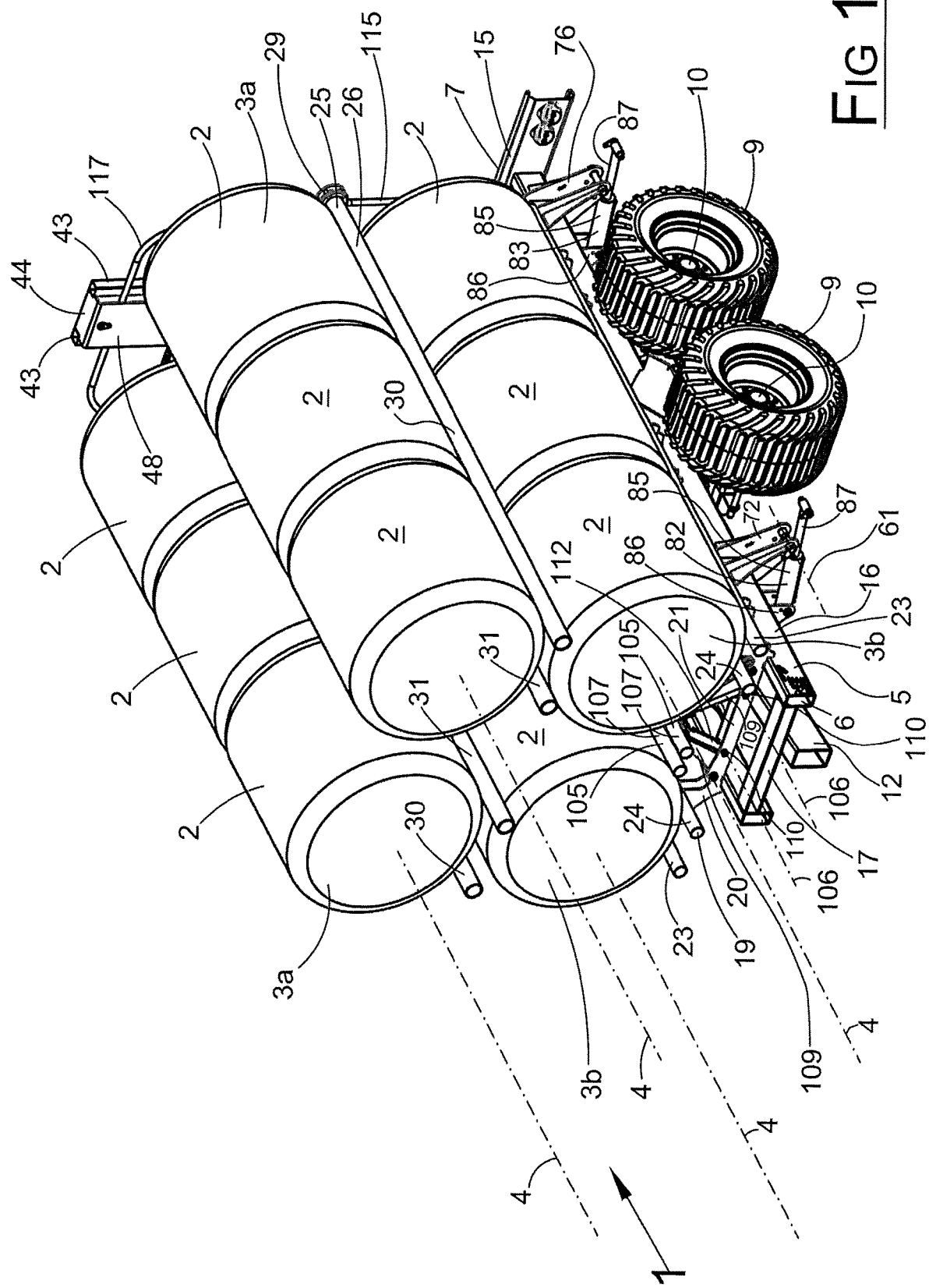
Figure 21:
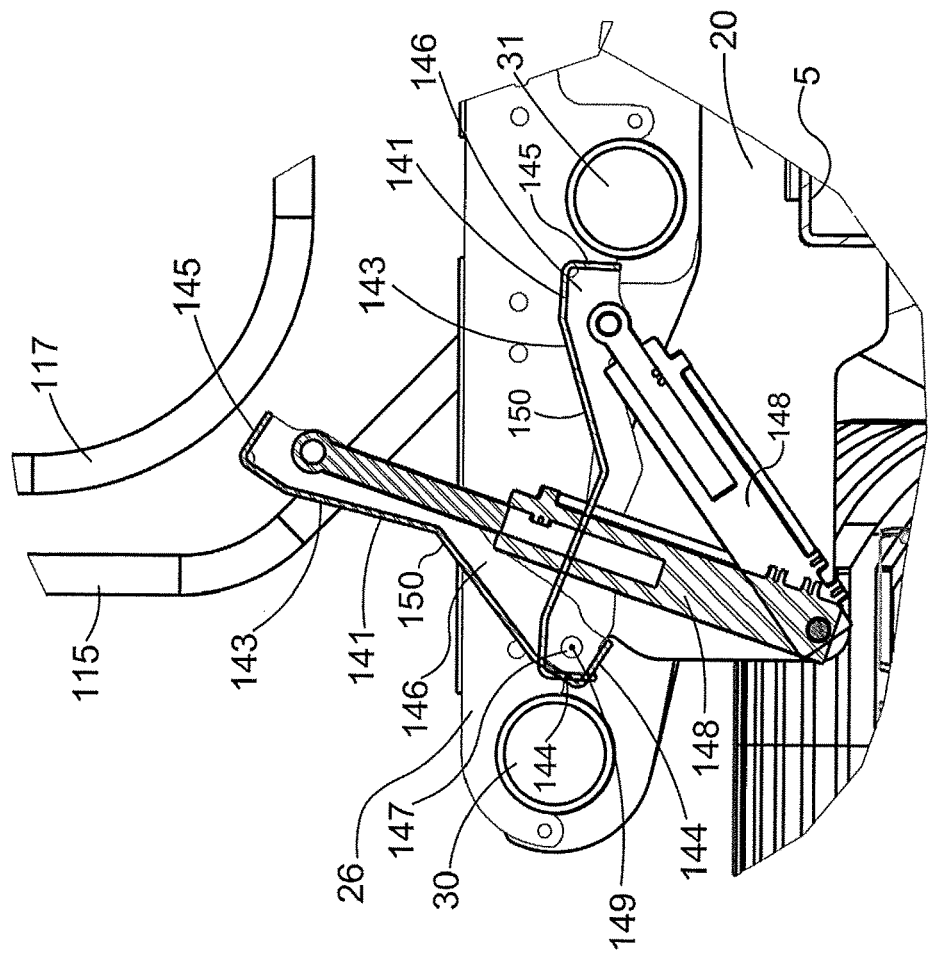
Figure 14:
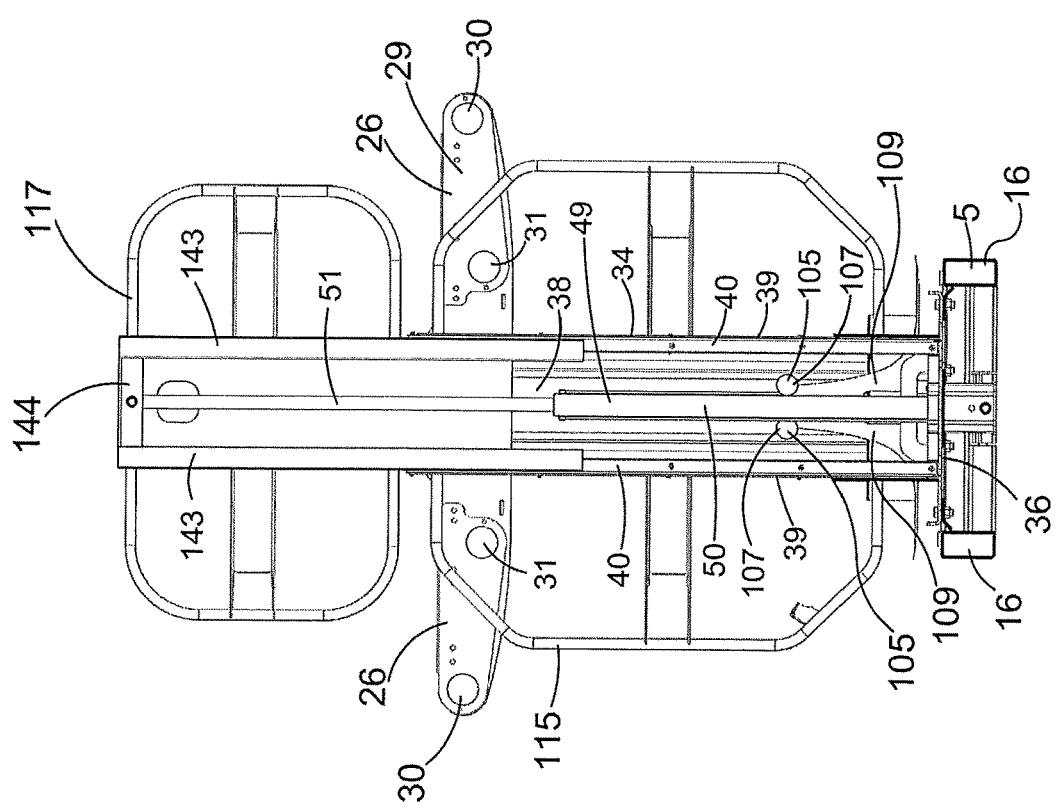
Figure 15:
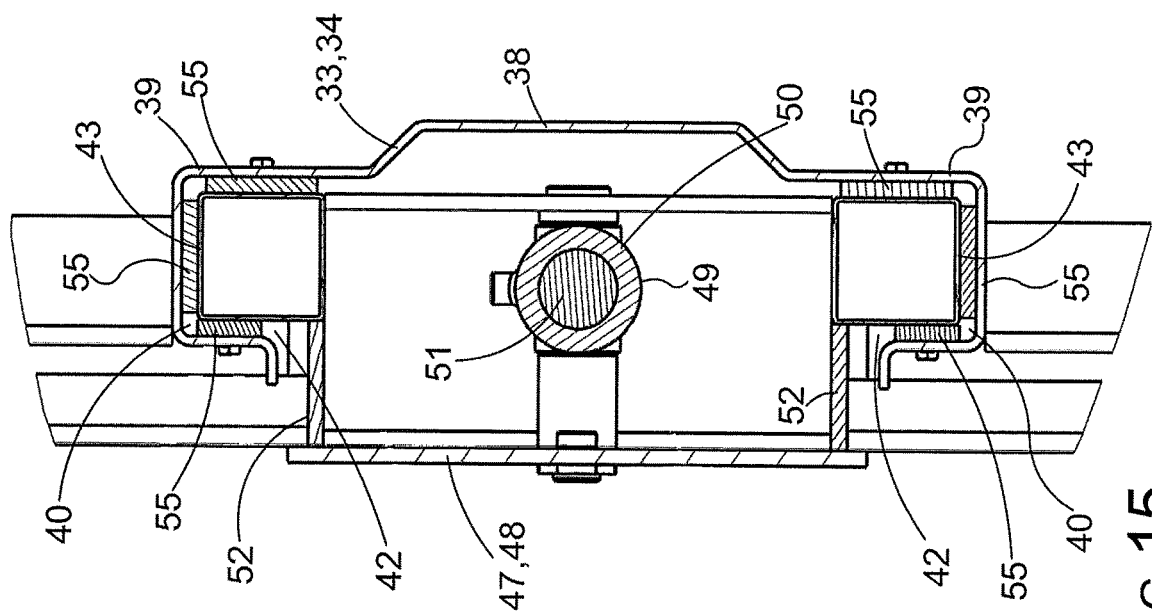
Figure 17:
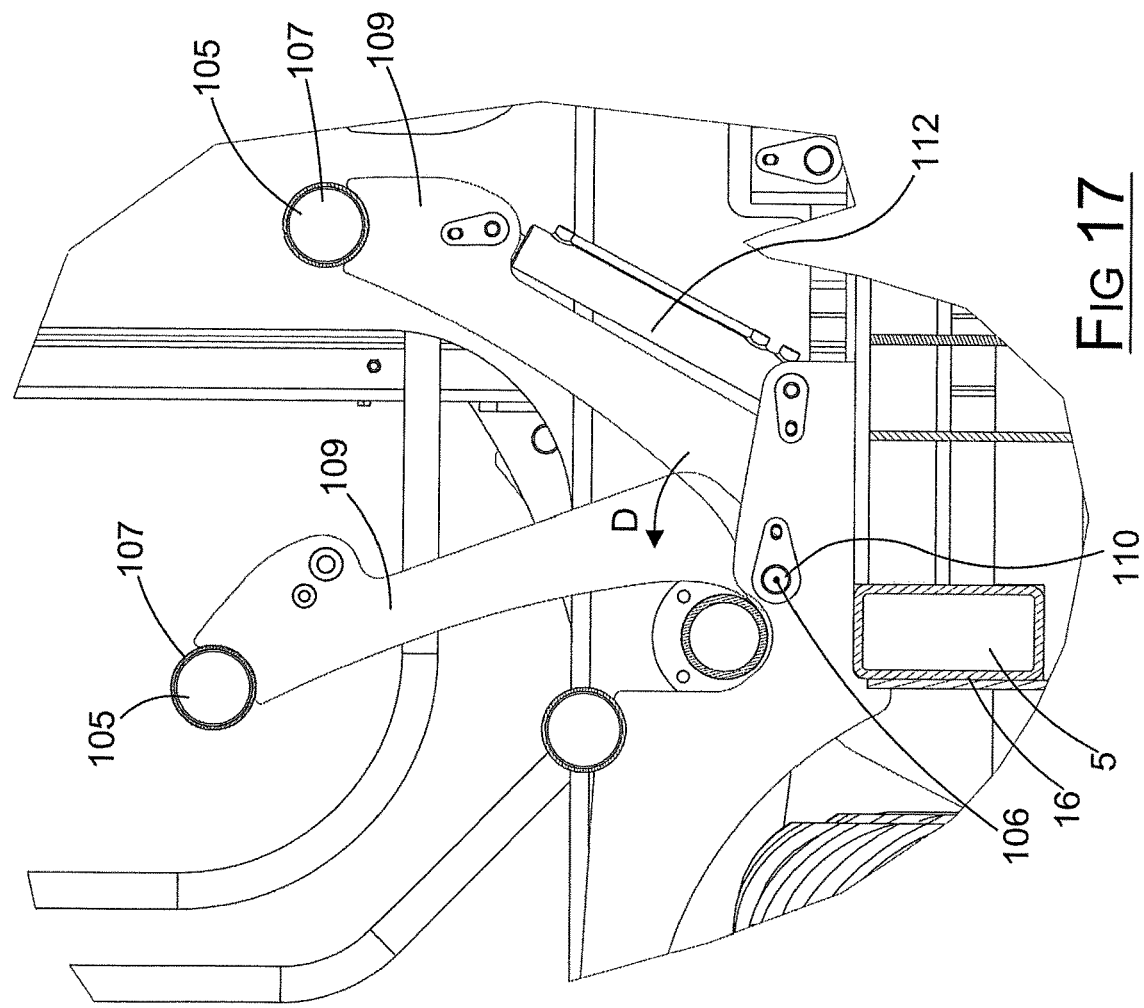
Figure 18:
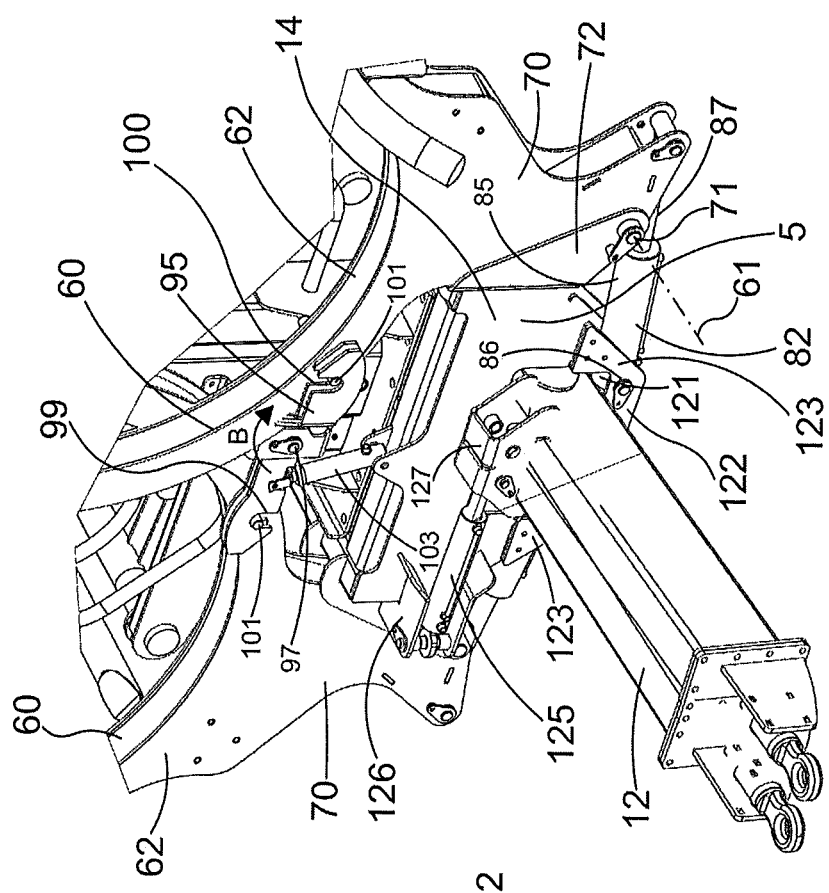
Figure 16:
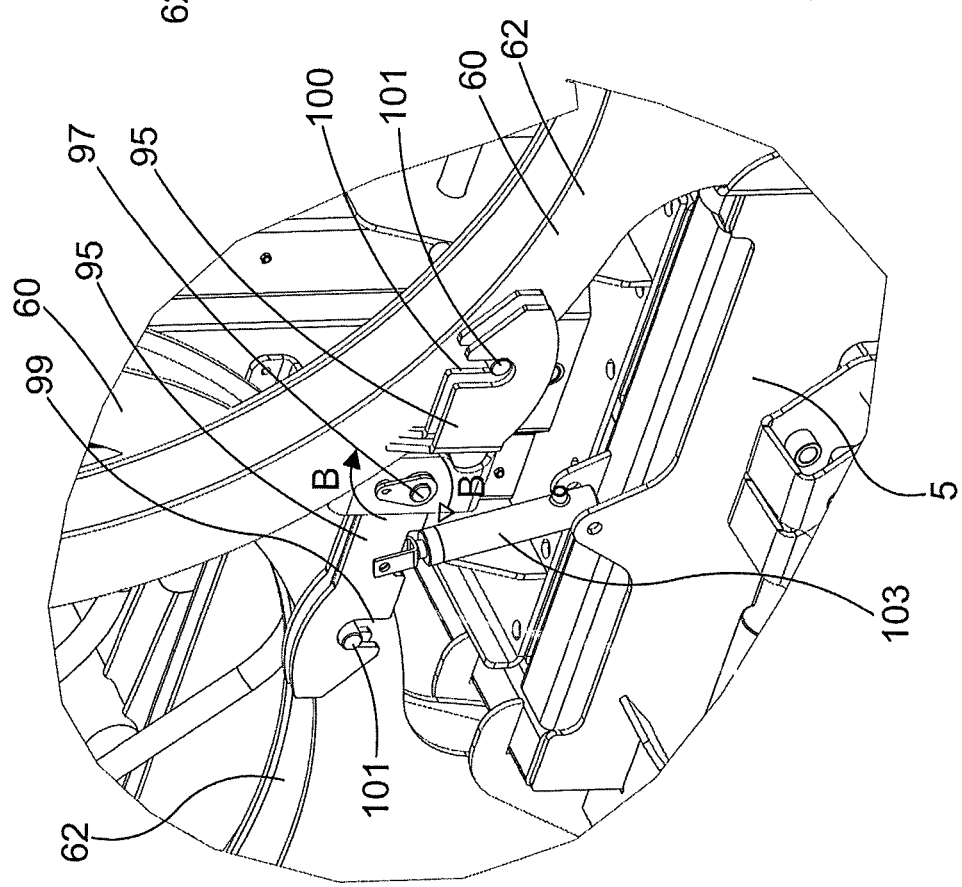
Figure 19:
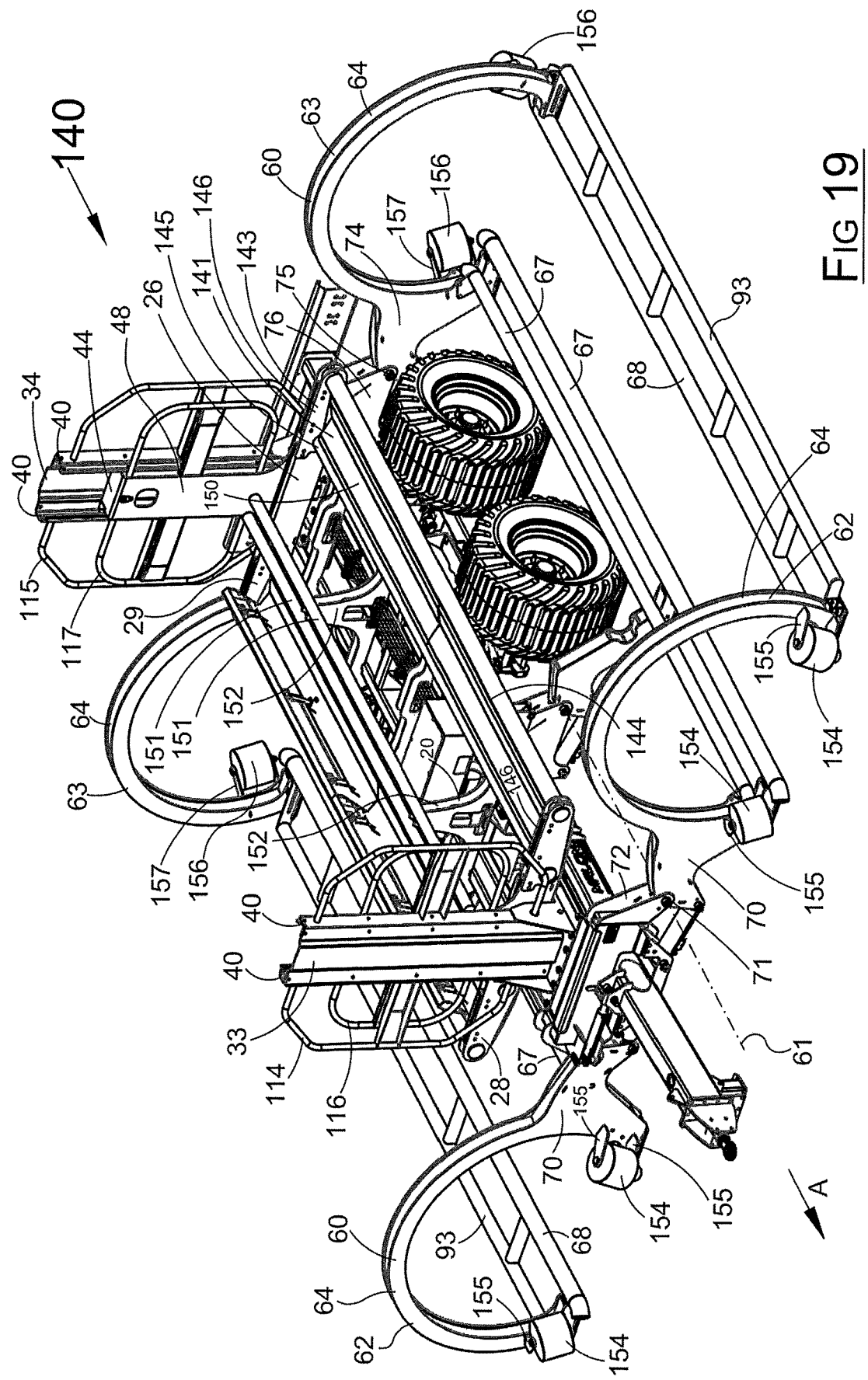
Figure 22:
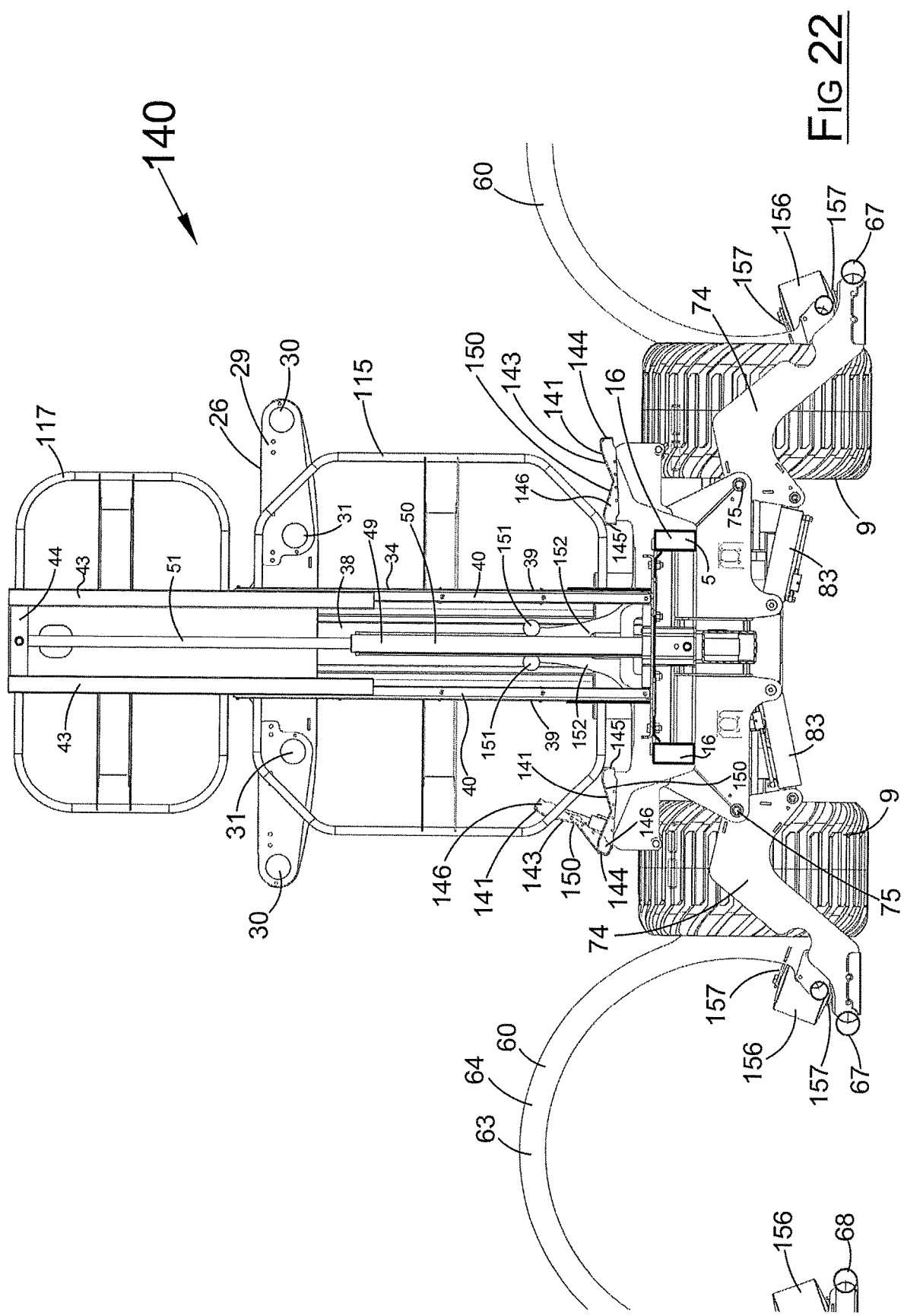

The invention will be more clearly understood from the following description of some preferred embodiments thereof which are given by way of example only with reference to the accompanying drawings, in which:

FIG. 1 is a perspective view of a bale transporter according to the invention,

FIG. 2 is an end elevational view of the bale transporter of FIG. 1 in the state of FIG. 1, FIG. 3 is a cross-sectional side elevational view of the bale transporter of FIG. 1 in the state of FIG. 1, FIG. 4 is a cross-sectional side elevational view of the bale transporter of FIG. 1 in a different state to that of FIG. 1, FIG. 5 is an enlarged cross-sectional end elevational view of the bale transporter of FIG. 1 with one part of the bale transporter illustrated in two states, FIG. 6 is a front perspective view of the bale transporter of FIG. 1 in use, FIG. 7 is a rear perspective view of the bale transporter of FIG. 1 in use, FIG. 8 is a side elevational view of the bale transporter of FIG. 1 in use, FIG. 9 is a front end elevational view of the bale transporter of FIG. 1 in use, FIG. 10 is a perspective view of the bale transporter of FIG. 1 in use, FIG. 11 is a side elevational view of the bale transporter of FIG. 1 in the state of FIG. 10, FIG. 12 is a perspective view of a part of the bale transporter of FIG. 1 in use, FIG. 13 is a perspective view of the bale transporter of FIG. 1 with a part of the bale transporter removed, FIG. 14 is a cross-sectional end elevational view of a detail of the bale transporter of FIG. 1, FIG. 15 is a cross sectional top plan view of the detail of FIG. 14 of the bale transporter of FIG. 1, FIG. 16 is a perspective view of another detail of the bale transporter of FIG. 1, FIG. 17 is an end elevational view of a further detail of the bale transporter of FIG. 1, FIG. 18 is a perspective view of another detail of the bale transporter of FIG. 1, FIG. 19 is a perspective view of a bale transporter according to another embodiment of the invention, FIG. 20 is an end elevational view of the bale transporter of FIG. 19, FIG. 21 is an end elevational view of a detail of the bale transporter of FIG. 19, and FIG. 22 is a cross-sectional end elevational view of the bale transporter of FIG. 19.

Referring to the drawings and initially to FIGS. 1 to 18 thereof, there is illustrated a bale transporter according to the invention indicated generally by the reference numeral 1 for transporting a plurality of bales 2, in this embodiment of the invention cylindrical bales of wrapped silage of the type which are commonly referred to as round bales, and typically are of diameter in the range of 1.2 metres to 1.6 metres and of axial length in the range of 1.2 metres to 1.3 metres.

The bale transporter 1 is configured to carry four parallel rows 3 of bales 2, with the bales 2 of each row 3 in end-to-end abutting relationship with each other and with the central geometrical axes 4 of the bales 2 in each row 3 axially aligned with each other and extending substantially parallel to the direction of normal forward motion of the transporter 1, namely, in the direction of the arrow A. The rows 3 of the bales 2 are arranged in pairs with one pair of the rows 3a supported above the other pair of rows 3b as will be described below.

The bale transporter 1 comprises a chassis 5 extending between a forward end 6 and a rearward end 7 of the bale transporter 1. The chassis 5 carries two pairs of ground engaging wheels 9 which are rotatably carried on respective axles 10 carried on the chassis 5. A tow bar 12 described in further detail below extends from the forward end 6 of the chassis 5 for hitching the bale transporter 1 to a suitable towing vehicle (not shown), for example, a tractor. The chassis 5 comprises a forward cross-member 14 and a rearward cross-member 15, both of which extend transversely relative to the direction of normal forward motion of the transporter 1 indicated by the arrow A. A pair of parallel spaced apart side members 16 extend between the forward and rearward cross-members 14 and 15, and a plurality of parallel spaced apart intermediate cross-members 17 extend between and join the side members 16.

A first bale carrier 19 for carrying one pair of the rows 3 of the bales 2, namely, the lower pair of rows 3b adjacent each other is essentially defined by the chassis 5 and comprises a main framework 20 which is partly formed by and supported on the chassis 5. The main framework 20 extends from the forward end 6 to the rearward end 7 of the chassis 5, and comprises a main forward cross-member 21 and a main rearward cross-member 22, both of which are supported on the side members 16 of the chassis 5. Two parallel spaced apart longitudinally extending outer side members 23 are carried on the main forward and rearward cross-members 21 and 22 on respective opposite ends of the main forward and rearward cross-members 21 and 22. Two parallel spaced apart longitudinally extending elongated inner members 24, which are spaced apart inwardly from the outer side members 23, cooperate with the corresponding outer side members 23 for supporting the two rows 3 of the bales 2 on the main framework 20. The outer side members 23 and the inner side members 24 extend substantially parallel to the direction of normal forward motion of the transporter 1.

A second bale carrier 25 comprising an elongated secondary framework 26 extending between the forward end 6 and the rearward end 7 of the chassis 5 is configured to carry one pair of the rows 3 of the bales 2, namely, the upper row 3a of the bales 2. The secondary framework 26 is moveable upwardly and downwardly as will be described below between a first state illustrated in FIGS. 1 to 3 adjacent the main framework 20 for receiving the two rows 3 of the bales 2 and a second state illustrated in FIGS. 4 and 6 to 9 spaced apart above the main framework 20 for supporting the upper pair of the rows 3a of the bales 2 above the lower pair of the rows 3b of the bales 2 on the main framework 20.

In this embodiment of the invention the main framework 20 and the secondary framework 26 of the bale transporter 1 are each of length to carry two rows 3 each with three bales 2 in end-to-end abutting relationship. However, it will be readily apparent to those skilled in the art that the chassis 5, the main framework 20 and the secondary framework 26 of the bale transporter 1 may be of any desired length within reason and in some embodiments of the invention it is envisaged that the chassis 5, the main framework 20 and the secondary framework 26 of the bale transporter 1 may be of length sufficient to carry rows 3 of bales 2 with up to eight bales 2 in each row 3 and in some cases up to ten bales 2 in each row 3.

The secondary framework 26 comprises a secondary forward cross-member 28 adjacent the forward end 6 of the chassis 5, and a secondary rearward cross-member 29 adjacent the rearward end 7 of the chassis 5. Two parallel spaced apart longitudinally extending elongated outer side members 30 extend between the secondary forward and rearward cross-members 28 and 29 on respective opposite ends of the secondary forward and rearward cross-members 28 and 29. Two parallel spaced apart longitudinally extending elongated inner members 31, which are spaced apart inwardly from the outer side members 30 extend between the secondary forward and rearward cross-members 28 and 29 and cooperate with the corresponding one of the outer side members 30 for supporting the two corresponding rows 3 of the bales 2 on the secondary framework 26. The outer side members 30 and the inner side members 31 extend parallel to the direction of normal forward motion of the transporter 1.

A pair of upstanding support members, namely, a forward upstanding member 33 and a rearward upstanding member 34 extending upwardly from the chassis 5 adjacent the forward and rear ends 6 and 7, respectively, thereof guide the secondary framework 26 between the first and second states. The forward upstanding support member 33 is secured and extends upwardly from a forward plate member 35 mounted on the chassis 5 adjacent the forward end 6 thereof. The rearward upstanding support member 34 is secured to and extends upwardly from a rearward plate member 36 mounted on the chassis 5 adjacent the rearward end 7 thereof. In this embodiment of the invention the forward and rearward upstanding support members 33 and 34 are formed of folded metal plate material each of which comprises a main central panel 38, and a pair of side panels 39. The side panels 39 are folded to form a pair of guide means, namely, guide channels 40 which act as guides for guiding the secondary framework 26 between the first and second states. Each guide channel 40 defines an open mouth 42, and the open mouths 42 of the corresponding guide channels 40 face each other, as can be seen in FIG. 15.

A pair of spaced apart guide rods 43 of box section steel joined by a top cross-member 44 are slideable upwardly and downwardly in the guide channels 40 in the corresponding one of the forward and rearward upstanding support members 33 and 34.

A carrier means, in this embodiment of the invention comprising a pair of carrier members, namely, a forward carrier member 47 and a rearward carrier member 48 both of steel plate material are secured to the top cross-member 44 of guide rods 43 of the corresponding one of the forward and rearward upstanding members 33 and 34. The forward and rearward carrier members 47 and 48 depend downwardly from the corresponding top cross-member 44 to the corresponding one of the secondary forward cross-member 28 and the secondary rearward cross-member 29 of the secondary framework 26, and are secured thereto, so that the guide rods 43 sliding in the corresponding guide channels 40 of the forward and rearward upstanding support members 33 and 34 guide the secondary framework 26 between the first and second states thereof.

A first urging means, in this embodiment of the invention a pair of first double acting hydraulic rams 49 located within the respective forward and rearward upstanding members 33 and 34 act between the corresponding one of the forward and rearward plate members 35 and 36 and the corresponding top cross-members 44 of the guide rods 43 for urging the top cross-member 44 upwardly and downwardly, for in turn urging the secondary framework 26 upwardly and downwardly between the first and second states thereof. In this embodiment of the invention each first hydraulic ram 49 comprises a cylinder 50, which is secured to the corresponding one of the forward and rearward plate members 35 and 36, and a piston rod 51, which is secured to the top cross-member 44 of the corresponding pair of guide rods 43 for urging the secondary framework 26 between the first and second states. In this embodiment of the invention the first hydraulic rams 49 also act as support means for supporting and releasably retaining the secondary framework 26 in the second state.

A pair of spaced apart reinforcing side plates 52 extend from each of the forward and rearward carrier members 47 and 48 to the corresponding ones of the corresponding pair of guide rods 43, for in turn securing the corresponding forward and rearward carrier members 47 and 48 to the corresponding pair of guide rods 43.

Each guide channel 40 is lined with three elongated substantially frictionless members 55 for slideably engaging the corresponding one of the guide rods 43 in the guide channels 40. In this embodiment of the invention the frictionless members 55 are of a substantially frictionless nylon material.

A pair of transfer means, in this embodiment of the invention a pair of transfer elements 60 are located on the respective opposite sides of the chassis 5 for picking up bales 2 on the ground and for transferring the bales to a selected one of the main and secondary frameworks 20 and 26, as will be described below. The transfer elements 60 are pivotally coupled to the chassis 5 on respective opposite sides thereof about respective spaced apart first longitudinally extending parallel spaced apart first pivot axes 61 which extend substantially parallel to the normal forward direction of motion of the bale transporter 1. The transfer elements are pivotal about the corresponding ones of the first pivot axes 61 from a first state illustrated in FIG. 10 for picking up the bales on the ground, to a second state illustrated in FIGS. 1, 2, and FIGS. 5 to 9 for transferring the bales onto the selected one of the main and secondary frameworks 20 and 26, as will be described below.

Each transfer element 60 comprises a forward end element 62 and a rearward end element 63 located adjacent the forward the rearward ends 6 and 7, respectively, of the chassis 5. Each of the forward and rearward end elements 62 and 63 comprises an arcuate member 64 which terminates at its respective opposite ends 65 and 66 in respective elongated first and second bale engaging members 67 and 68, respectively, which will be described in more detail below.

The arcuate member 64 of each forward end element 62 is carried on a forward pivotal bracket 70, which in turn is pivotally carried on a forward pivot shaft 71, which in turn is carried on a corresponding pair of spaced apart forward carrier brackets 72 extending downwardly and outwardly from the corresponding side member 16 of the chassis 5 adjacent the forward cross-member 14 of the chassis 5. The arcuate member 64 of each rearward end element 63 is carried on a rearward pivotal bracket 74, which in turn is pivotally carried on a rearward pivot shaft 75, which in turn is carried on a corresponding pair of spaced apart rearward carrier brackets 76 which extend downwardly and outwardly from the corresponding side member 16 of the chassis 5 adjacent the rearward cross-member 15 of the chassis 5. An intermediate pivotal bracket 78 extends from the first bale engaging member 67 and is pivotally carried on an intermediate pivot shaft 79, which in turn is carried on a corresponding pair of spaced apart intermediate carrier brackets 80 which extend downwardly and outwardly from the corresponding one of the side members 16 intermediate the forward and rearward cross members 14 and 15, respectively. The forward, rearward and intermediate pivot shafts 71, 75 and 79, respectively, of each transfer element 60 define the corresponding first pivot axis 61 about which the corresponding transfer element 60 is pivotal from the first state to the second state.

A second urging means for urging each one of the transfer elements 60 between the first and second state thereof in this embodiment of the invention comprises three double acting second hydraulic rams, namely, a forward double acting hydraulic ram 82, a rearward double acting hydraulic ram 83, and an intermediate double acting hydraulic ram 84. The forward, rearward and intermediate hydraulic rams 82, 83 and 84 act between the chassis 5 and the corresponding one of the forward pivotal bracket 70, the rearward pivotal bracket 74 and the intermediate pivotal bracket 78 of the corresponding transfer element 60 for urging the corresponding transfer element 60 between the first and second states. A cylinder 85 of each one of the forward, rearward and intermediate hydraulic rams 82, 83 and 84 is coupled to the chassis 5 by a corresponding pivotal coupling bracket 86. A piston rod 87 of each one of the forward, rearward and intermediate hydraulic rams 82, 83 and 84 is pivotally coupled to the corresponding one of the corresponding forward, rearward and intermediate pivotal brackets 70, 74 and 78, respectively.

Returning now to the first and second bale engaging members 67 and 68 of the transfer elements 60, the first and second bale engaging members 67 and 68 extend parallel to each other between the forward and rearward end elements 62 and 63, and are spaced apart from each other a distance sufficient to define an elongated bale accommodating opening 89 therebetween to accommodate a lower portion of a bale resting on the ground therebetween. Additionally, the arcuate members 64 of the forward and rearward end elements 62 and 63 each define a bale accommodating opening 88 of diameter sufficient to accommodate a bale resting on the ground therethrough. The bale accommodating openings 88 of the forward and rearward end elements 62 and 63 define respective centres of radii which substantially coincide with the central geometrical axes 4 of the bales 2 of the corresponding row 3 located in the corresponding transfer element 60. Thus, with one of the transfer elements 60 in the first state, by urging the transporter 1 towards a bale 2 resting on the ground, with the central geometrical axis 4 of the bale 2 aligned with the transfer element 60, as the bale is being captured by the transfer element, the bale passes through the bale accommodating opening 88 in the forward end element 62, and the first and second bale engaging members 67 and 68 of the transfer element 60 pass on opposite sides of the bale for subsequently engaging the bale for lifting the bale from the ground.

The longitudinal spacing between the forward and rearward end elements 62 and 63 of each transfer element 60 is such as to be greater than the total length of a full row 3 of the bales 2 axially aligned and in end-to-end abutting engagement in the corresponding transfer element 60, so that the row 3 of the bales 2 can be discharged from the transfer element 60 onto the secondary framework 26 when the transfer element 60 is in the second state. This allows each transfer element 60 after discharge of a row 3 of the bales 2 onto the secondary framework 26 to be pivoted from the second state to the first state to pick up the next row 3 of bales 2 for transfer onto the main framework 20 once the secondary framework 26 has been urged from the first state to the second state.

Leading ends 90 and trailing ends 91 of the first and second bale engaging members 67 and 68 of each transfer element 60 are angled outwardly relative to the corresponding transfer element 60 for guiding a bale on the ground, in the case of the leading ends 90 into the corresponding transfer element 60, and in the case of the trailing ends 91 for guiding the bales out of the transfer elements 60 during discharge of bales from the bale transporter 1.

The first bale engaging member 67 and the second bale engaging member 68 of each transfer element 60 are located on the arcuate members 64 of the forward and rearward end elements 62 and 63, so that the first bale engaging member 67 is closer to the chassis 5 than the second bale engaging member 68 for a reason to be discussed below. First and second struts 92 and 93 extend between the arcuate members 64 of the respective forward and rearward end elements 62 and 63 of each transfer element 60. The first strut 92 of each transfer element 60 extends parallel with and close to but spaced apart from the first bale engaging member 67. The second strut 93 of each transfer element 60 extends parallel with and close to but spaced apart from the second bale engaging members 68, and is coupled to the respective arcuate members 64 of the transfer element 60 by respective mounting brackets 94 so that the second strut 93 is located spaced apart on the outer sides of the corresponding arcuate members 64 for a purpose to be described below. An intermediate bracket 102 connects each second strut 93 to the second bale engaging member 68 of the corresponding transfer element 60.

The first and second bale engaging members 67 and 68 together with the first strut 92 of each transfer element 60 define a portion of the periphery of the bales 2 when located in the corresponding transfer element 60 for supporting the bales during transfer of the bales in the transfer element 60 from the ground to the selected one of the main and secondary frameworks 20 and 26, as the transfer element 60 is being pivoted about the corresponding first pivot axis 61 from the first state to the second state. As well as the first and second bale engaging members 67 and 68 and the first strut 92 of each transfer element 60 supporting the bales as the bales are being transferred from the ground onto the selected one of the main framework 20 and the secondary framework 26, when the bale transporter 1 is fully loaded with two rows 3b of bales 2 supported on the main framework 20 and two rows 3a of bales 2 supported on the secondary framework 26 above the two rows 3b of bales 2 on the main framework 20, and with the transfer elements 60 in the second state, the first and second bale engaging members 67 and 68 and the first strut 92 of each transfer element 60 act to retain the corresponding rows 3b of bales 2 on the main framework 20, and the second strut 93 of each transfer element 60 acts to retain the corresponding rows 3a of bales 2 on the secondary framework 26.

A retaining means for retaining the transfer elements 60 in the second state comprise a pair of forward and rearward retaining members 95 and 96, respectively, pivotally coupled to the chassis 5 by respective forward and rearward pivot pins 97 and 98 extending from the forward and rearward ends 6 and 7, respectively of the chassis 5. Each forward and rearward retaining member 95 and 96 is provided with a pair of retaining slots 99 and 100 on respective opposite sides of the corresponding one of the pivot pins 97 and 98. The retaining slot 99 of each retaining member 95 and 96 faces in a generally downwardly direction, while the retaining slot 100 of each retaining member 95 and 96 faces in a generally upwardly direction, for engaging corresponding retaining pins 101 on the forward and rearward end elements 62 and 63, respectively, of the respective transfer elements 60. A third urging means comprising forward and rearward third hydraulic rams 103 and 104, respectively, acting between the chassis 5 and the corresponding one of the forward and rearward retaining members 95 and 96 pivot the corresponding one of the retaining members 95 and 96 in the direction of the arrow B from a retaining state illustrated in FIGS. 5 and 16 with the retaining slots 99 and 100 engaging the corresponding retaining pines 101 of the corresponding transfer elements 60, to a release state (not shown) with the first retaining members 95 and 96 disengaged from the retaining pins 101 for permitting the transfer elements 60 to be pivoted between the first and second states.

A discharge means comprising a pair of discharge elements 105 for discharging the bales from the main and secondary frameworks 20 and 26 are pivotally coupled to the chassis 5 about respective spaced apart parallel longitudinally extending second pivot axes 106. The discharge elements 105 are pivotal about the respective second pivot axes 106 in the directions of the arrows D from a rest state illustrated in FIGS. 2 and 17 for supporting corresponding rows 3 of bales 2 on the main framework 20 to a discharge state for discharging the corresponding row 3 of bales 2 from the main framework 20, and also from the secondary framework 26 when the secondary framework 26 is in the first state. In FIG. 2 both of the discharge elements 105 are illustrated in the rest state, and the left hand discharge element 105 is also illustrated in the discharge state. In FIG. 17 the right hand position of the discharge element 105 is the rest state, and the left hand position of the discharge element 105 is the discharge state. Each discharge element 105 comprises an elongated longitudinally extending discharge bar 107 for engaging the corresponding row 3 of bales 2 on the main framework 20 or the secondary framework 26, as the case may be. The discharge bar 107 of each discharge element 105 terminates at its opposite ends in respective pivotal members 109. The pivotal members 109 of each discharge element 105 are pivotally coupled to the chassis 5 by corresponding pivot shafts 110 mounted on the chassis 5. The pivot shafts 110 of the pivotal members 109 of the corresponding discharge element 105 define the corresponding second pivot axes 106 about which the corresponding discharge elements 105 are pivotal between the rest state and the discharge state. A fourth urging means, namely, a pair of double acting fourth hydraulic rams 112 acting between the chassis 5 and each one of the pivotal members 109 of the corresponding discharge element 105 pivot the corresponding discharge element 105 about the corresponding second pivot axis 106 between the rest state and the discharge state of the corresponding discharge element 105.

A transversely extending forward lower end frame 114 is mounted on the forward upstanding support member 33, and a transversely extending rearward lower end frame 115 is mounted on the rearward upstanding support member 34. The forward and rearward lower end frame 114 and 115 retain the two rows 3 of bales 2 on the main framework 20 during transportation thereof by the bale transporter 1. A transversely extending forward upper end frame 116 extends from the forward carrier member 47 which carries the secondary framework 26 adjacent the secondary forward cross-member 28, and a transversely extending rearward upper end frame 117 extends from the rearward carrier member 48 which carries the secondary framework 26 adjacent the secondary rearward cross-member 29. The forward and rearward upper end members 116 and 117 retain the two rows 3 of bales 2 on the secondary framework 26 during transportation thereof on the bale transporter 1.

Turning now to the tow bar 12, the tow bar 12 is pivotally coupled to the chassis 5 by a pivot mounting bracket 119 which is secured to one of the intermediate cross-members 17 intermediate the forward cross-member 14 and the rearward cross-member 15. The pivot mounting bracket 119 carries a carrier pivot shaft 120 which lies in a substantially vertical longitudinally extending plane, and is slightly forwardly upwardly inclined relative to a substantially vertically extending transverse plane, see FIGS. 3 and 4. The tow bar 12 is pivotally carried on the carrier pivot shaft 120 and extends substantially perpendicularly therefrom in a generally forwardly slightly downwardly inclined direction, so that the tow bar 12 extends beneath the forward cross-member 14. A tow bar accommodating opening 121 is formed beneath the forward cross-member 14 by a lower forward cross-member 122 extending parallel to and spaced apart below the forward cross-member 14, and by a pair of spaced apart parallel side members 123 which extend from the lower forward cross-member 122 upwardly to the forward cross-member 14 and secure the lower forward cross-member 122 to the forward cross-member 14, with the tow bar accommodating opening 121 defined between the forward cross-member 14, the lower forward cross-member 122 and the side members 123. The tow bar 12 extends through the tow bar accommodating opening 121, and is supported on the lower forward cross-member 122. The side members 123 limit the extent of pivotal movement of the tow bar 12 from side to side about the carrier pivot shaft 120. The forward cross-member 14 and the lower forward cross-member 122 within the tow bar accommodating opening 121 are lined with substantially frictionless nylon bearing plates 124 for accommodating sliding movement of the tow bar 12 within the tow bar accommodating opening 121 between the side members 123.

A fifth urging means for urging the tow bar 12 about the carrier pivot shaft 120 within the tow bar accommodating opening 121 between the opposite side members 123 comprises a double acting fifth hydraulic ram, namely, a tow bar operating ram 125 which acts between the forward cross-member 14 and the tow bar 12. The tow bar operating ram 125 is pivotally coupled to the forward cross-member 14 by a pivot coupling bracket 126 and is coupled to the tow bar 12 by a pivot coupling bracket 127. The tow bar operating ram 125 is operated under the control of an hydraulic control system (not shown) of the bale transporter 1 for selectively positioning the tow bar 12 to extend in a first state centrally and longitudinally from the chassis 5 and parallel to the normal forward direction of motion of the transporter 1 for facilitating towing of the transporter 1 behind a towing vehicle with the transporter 1 aligned with the towing vehicle, and in either one of a pair of second states with the tow bar 12 abutting either one of the side members 123 defining the tow bar accommodating opening 121 for facilitating towing of the transporter 1 behind a towing vehicle with the transporter 1 offset to one side of the path of traverse of the towing vehicle for facilitating picking-up of bales from the ground by the corresponding one of the transfer elements 60, depending on the side member 123 to which the tow bar 12 is urged by the tow bar operating ram 125.

The tow bar operating ram 125 is also controllable by the hydraulic control system (not shown) of the transporter 1 to incrementally move the tow bar 12 from the first state to either one of the second states into a desired position intermediate the first state and either one of the second states for steering the transporter 1 relative to the towing vehicle towards a bale on the ground, and in particular for fine tuning the alignment of the relevant one of the transfer elements 60 with the bale. By incrementally pivoting the tow bar 12 by the tow bar operating ram 125 about the carrier pivot shaft 120 the direction in which the bale transporter 1 is moving relative to the towing vehicle may be slightly altered for fine tuning the alignment of the relevant one of the transfer elements 60 with a bale resting on the ground to be picked up by the transfer element 60.

The tow bar operating ram 125 as well as acting to urge the tow bar 12 between the first state with the tow bar 12 extending substantially centrally aligned with the transporter 1 and the respective second states with the tow bar 12 abutting a corresponding one of the side members 123 of the tow bar accommodating opening 121, also acts as a second retaining means for retaining the tow bar in a selected one of the first and second states, and also in a selected intermediate state intermediate the first and second states.

In FIGS. 1 and 18 the tow bar 12 is illustrated in two different positions.

In general, the bale transporter is constructed of steel. The chassis 5 is constructed of channel section steel, and the elongated members of the secondary framework and the transfer elements 60 are of tubular steel of circular transverse cross-section. The arcuate members 64 of the respective transfer elements 60 are of box section steel. Mounting brackets and pivot mounting brackets as well as other brackets in general are constructed of steel plate material.

In use, with the bale transporter 1 hitched to a prime mover, for example, a tractor or other towing vehicle by the tow bar 12, and with the tow bar 12 retained by the tow bar operating ram 125 in the first state extending centrally through the tow bar accommodating opening 121, in other words, extending through the tow bar accommodating opening 121 mid-way between the side members 123, and with the secondary framework 26 in the first state, and the transfer elements 60 retained by the retaining members 95 and 96 in the second retaining state, the bale transporter 1 is towed by the towing vehicle to a field or other area from which bales are to be picked up and transported.

When the area within which the bales to be collected are located has been reached, with the secondary framework 26 in the first state, the first retaining members 95 and 96 are operated by the third hydraulic rams 103 and 104 into the release state, and one or both of the transfer elements 60 are pivoted from the second state into the first state to engage and pick up bales from the ground. The tow bar operating ram 125 is operated to urge the tow bar 12 from the first state to the appropriate one of the second states, so that the transporter 1 is offset sidewardly of the path of travel of the towing vehicle towards the first or the next bale which is to be picked up from the ground. The first or next bale to be picked up is approached by the bale transporter 1 and with the appropriate one of the transfer elements 60 substantially aligned with the bale and also aligned with the central geometrical axis of the bale, so that when picked up by the transfer element 60 the central geometrical axis of the bale extends parallel to the direction of normal forward motion of the transporter 1, and parallel to the first and second bale engaging members 67 and 68, and also substantially coincides with the centre of radius of the bale accommodating opening 88 of the forward end element 62 of the corresponding transfer element 60. If the appropriate one of the transfer elements 60 is not altogether aligned with the bale which is resting on the ground and which is to be picked up, the hydraulic ram 125 is operated to incrementally urge the tow bar 12 between the second states through the first state to alter the direction of travel of the bale transporter 1 relative to the towing vehicle in order to fine tune the alignment of the transfer element 60 with the bale to be picked up.

The bale transporter is then urged towards the bale on the ground with the first and second bale engaging members 67 and 68 of the relevant transfer element 60 on the respective opposite sides of the portion of the bale which is resting on the ground. As the transfer element 60 is urged further forwardly the forward end element 62 passes over the bale as the bale is being captured by the transfer element 60. The bale transporter 1 is urged further forward until the bale is located within the transfer element 60 adjacent the forward end element 62, and with the adjacent end of the bale substantially lying in a plane defined by the forward end element 62. The transfer element 60 is then raised just sufficiently by the forward, rearward and intermediate rams 82, 83 and 84 to raise the captured bale spaced apart above the ground, and the bale transporter 1 is towed to the next bale to be picked up.

The next bale to be picked up by the transfer element 60, which has already picked up a bale, is approached in a similar manner as already described with reference to the capturing of the first bale, and the bale transporter 1 is urged forwardly to capture the next bale, and is urged forwardly until the next bale is in end-to-end abutting relationship with the already captured bale. The transfer element 60 is lowered to the first state so that the already captured bale or bales are resting on the ground, and with the next bale in end-to-end abutting relationship with the last to be captured bale, the bale transporter 1 is urged forwardly to capture the next bale. As the next bale is being captured the already captured bale or bales are urged rearwardly in the transfer element 60 towards the rearward end element 63 by the capturing of the bale now being captured. The bale transporter 1 is urged forwardly until the next bale which is being captured is located within the transfer element with the exposed end of the just captured bale lying in the plane defined by the forward end element 62 of the transfer element 60. This bale capturing procedure continues until a row 3 of three bales 2 have been captured in one of the transfer elements 60. At that stage, if the secondary framework 26 is not in the first state, the secondary framework 26 is lowered into the first state by the first hydraulic rams 49. The transfer element 60 with the row 3 of the three bales 2 is then pivoted from the first state by the forward, rearward and intermediate rams 82, 83 and 84 into the second state to deposit the row 3 of the bales 2 on the secondary framework 26 to the adjacent side thereof. The transfer element 60 may remain in the second state until the other one of the two transfer elements 60 has picked up three bales. At which stage the other transfer element 60 is then pivoted from the first state to the second state in order to deposit the row 3 of the bales 2 on the secondary framework 26 adjacent the row 3 of bales 2 already deposited on the secondary framework 26. The two transfer elements 60 are then pivoted from the second state to the first state, and the secondary framework 26 with the two rows 3 of bales 2 located thereon is then urged upwardly from the first state to the second state by the first rams 49.

With the secondary framework 26 in the second state, two more rows 3 of three bales 2 are picked up by the two transfer elements 60. As each transfer element 60 picks up a row 3 of three bales 2, that transfer element 60 is pivoted from the first state to the second state by the forward, rearward and intermediate hydraulic rams 82, 83 and 84 to deposit the row 3 of bales 2 on the main framework 20. When both of the rows 3 of the bales 2 have been picked up by the two transfer elements 60 and have been deposited on the main framework 20, the two transfer elements 60 remain in the second state, and the forward and rearward retaining members 95 and 96 are urged by the forward and rearward second hydraulic rams 103 and 104 from the release state to the retaining state for engaging the retaining pins 101 of the respective transfer elements 60 in the retaining slots 99 and 100 of the forward and rearward first retaining members 95 and 96, respectively, for in turn retaining the transfer elements 60 in the second state. With the transfer elements 60 retained in the second state, the first and second bale engaging members 67 and 68 and the first strut 92 of the respective transfer elements 60 act to retain the two corresponding rows 3b of the bales 2 on the main framework 20 during transportation. The second struts 93 of the respective transfer elements 60 act to engage and retain the two rows 3a of the bales 2 on the secondary framework 26 during transportation. With the four rows 3 of bales 2 so retained on the bale transporter 1, the tow bar 12 is urged by the hydraulic ram 125 into the first state extending centrally from and aligned with the bale transporter 1, and the bale transporter 1 is then towed to an area where the bales are to be stored.

To discharge the bales 2 from the bale transporter 1, each transfer element 60 is pivoted from the second state to the first state simultaneously while the corresponding one of the discharge elements 105 is being pivoted from the rest state to the discharge state. The sequence in which the bales 2 are discharged from the bale transporter 1 is as follows. Initially, the discharge elements 105 and the transfer elements 60 discharge the two rows 3 of bales 2 from the main framework 20 to the ground. The secondary framework 26 is then urged by the first hydraulic rams 49 from the second state to the first state, and two rows 3 of the bales 2 on the secondary framework 26 are discharged by the discharge elements 105 and the transfer elements 60 to the ground.

Initially, the forward and rearward retaining members 95 and 96 are pivoted by the forward and rearward hydraulic rams 103 and 104 from the retaining state to the release state in order to disengage the retaining members 95 and 96 from the retaining pins 101 of the respective transfer elements 60. Each transfer element 60 is then pivoted from the second state to the first state simultaneously as the corresponding discharge element 105 is urged from the rest state to the discharge state for in turn discharging the corresponding row 3 of bales 2 from the main framework 20 to the ground. When the two rows 3 of bales 2 are resting on the ground, the bale transporter 1 is then towed forwardly thus leaving the two rows 3 of bales 2 on the ground as the two transfer elements 60 are urged forwardly relative to the bales 2 resting on the ground so that the bales 2 effectively pass through the rearward end elements 63 of the respective transfer elements 60.

With the transfer elements 60 still in the first state, the two discharge elements 105 are urged from the discharge state to the release state by the fourth hydraulic rams 112. The secondary framework 26 with the two rows 3 of bales 2 supported thereon is then urged downwardly from the second state to the first state by the first hydraulic rams 49. With the secondary framework 26 in the first state, the transfer elements 60 are pivoted from the first state into the second state. The transfer elements 60 are then urged from the second state to the first state simultaneously as the discharge elements 105 are being urged from the rest state to the discharge state to discharge the two rows 3 of bales 2 from the secondary framework 26 to the ground. With these two rows 3 of bales 2 resting on the ground, the bale transporter 1 is urged further forwardly in order to disengage the transfer elements 60 from the two rows 3 of bales 2.

When the four rows 3 of bales 2 have been discharged from the bale transporter 1, with the secondary framework 26 in the first state, the transfer elements 60 are pivoted from the first state into the second state and are retained in the second state by the forward and rearward first retaining members 95 and 96. The bale transporter 1 is then ready to pick up the next load of bales 2.

Referring now to FIGS. 19 to 22 there is illustrated a bale transporter according to another embodiment of the invention indicated generally by the reference numeral 140. The bale transporter 140 is substantially similar to the bale transporter 1, and similar components are identified by the same reference numerals. Only the aspects of the bale transporter 140 which are different to the bale transporter 1 will be described.

In this embodiment of the invention the bale transporter 140 comprises a pair of discharge elements 141 which comprise respective discharge cradles 143. Each discharge cradle 143 is of sheet metal and comprises a longitudinally extending central bale supporting panel 150 and a pair of downwardly extending side members, namely, an outer side member 144 and an inner side member 145 extending downwardly from the central bale supporting panel 150. The bale supporting panel 150 and the outer and inner side members 144 and 145 terminate in their respective opposite ends in forward and rearward end members 146. The end members 146 of each discharge element 141 are pivotally coupled to the chassis 5 by pivot shafts 147 carried on the chassis 5, which define a second pivot axis 149 about which the corresponding discharge element 141 is pivotal between the rest and discharge states. A fourth urging means, namely, a pair of double acting fourth hydraulic rams 148 acting between the chassis 5 and the corresponding end member 146 of each discharge element 141, pivots the corresponding discharge element 141 between the rest state and the discharge state.

The central bale supporting panel 150 of each discharge cradle 143 is configured to support the corresponding row 3 of bales 2 on the main framework 20 when the discharge element 141 is in the rest state.

Each discharge cradle 143 of each discharge element 141 is of length just less than the length of the main and secondary frameworks 20 and 26, so that the end members 146 are located within the main forward and rearward cross-members 21 and 22 of the main framework 20, and can operate within the secondary forward and rearward cross-members 28 and 29 of the secondary framework 26 when the secondary framework 26 is in the first state, in order to facilitate pivoting of the discharge elements 141 between the rest state and the discharge state.

In this embodiment of the invention since the discharge cradles 143 in the rest state support the corresponding rows 3 of bales 2 on the main framework 20, the two inner members of the main framework 20 and the two outer side members of the main framework 20 are no longer required and are omitted from the bale transporter 140 of this embodiment of the invention. Accordingly, when each discharge element 141 is in the rest state, the central bale supporting panel 150 of each discharge cradle 143 forms a seat on which the corresponding row 3 of bales 2 is supported on the main framework 20.

Two longitudinally extending upper support members 151 carried on respective pairs of upwardly extending carrier members 152, which extend upwardly from the chassis 5, engage the rows 3 of the bales 2 on the main framework 20. The upper support members 151 also act to retain the rows 3 of the bales 2 on the discharge cradles 143 when the discharge element 141 is in the rest state. The upper support members 151 also act to correctly locate the rows 3 of the bales 2 on the main framework 20 and on the secondary framework 26 as the rows 3 are being delivered onto the main and secondary frameworks 20 and 26 by the transfer elements 60.

Additionally, in this embodiment of the invention forward cylindrical guide rollers 154 are rotatably mounted on brackets 155 extending generally forwardly from the forward end element 62 of each transfer element 60 on respective opposite sides thereof for guiding and easing the bales into the transfer elements 60. Rearward cylindrical guide rollers 156 are rotatably mounted in brackets 157 on the rearward end elements 63 on each side thereof of each transfer element 60 with the guide rollers 156 extending generally rearwardly from the rearward end elements 63.

Otherwise, the bale transporter 140 and its operation and use is similar to that of the bale transporter 1 described with reference to FIGS. 1 to 18.

While the bale transporters have been described as being suitable for carrying two rows of bales on the main framework and on the secondary framework, in some embodiments of the invention it is envisaged that the bale transporters may be configured to carry only one row of bales on each of the main framework and the secondary framework. In which case, the bale transporter would be provided with only one transfer element and one discharge element.

It will be appreciated that while the bale transporters have been described as comprising transfer elements of a specific shape and construction, the transfer elements may be of any other suitable shape and/or construction. Needless to say, the main and secondary frameworks may be of any other suitable construction, and in some embodiments of the invention it is envisaged that the chassis may form the main framework for supporting the two lower rows of bales.

While the bale transporters have been described as being suitable for towing behind a vehicle, the bale transporters may be constructed as self-propelled vehicles.

It will also be appreciated that while the guide rollers have been described as being of cylindrical shape, guide rollers of any other suitable shape may be provided. Furthermore, it will be appreciated that guide rollers may only be provided on the forward end element of each transfer element in some embodiments of the invention, and it is also envisaged that a single guide roller may be provided on either or both the forward and rearward end elements of the transfer elements.

The invention claimed is:

1. A method for transporting bales, the method comprising:
providing a bale transporter with an elongated first bale carrier, and an elongated second bale carrier, the second bale carrier being moveable between a first state adjacent the first bale carrier, and a second state spaced apart upwardly above the first bale carrier,
picking up bales from the ground by a transfer means with the bales aligned in the transfer means, with the second bale carrier in the first state transferring the aligned bales by the transfer means onto the second bale carrier with the bales aligned in an elongated row, urging the second bale carrier into the second state,
picking up further bales from the ground by the transfer means with the bales aligned in the transfer means,
transferring the aligned bales onto the first bale carrier with the bales aligned in an elongated row,
the method further comprising:
discharging the bales from the first bale carrier prior to discharging of the bales from the second bale carrier, the bales being discharged from the first and second bale carriers onto the transfer means as the transfer means is being urged from the second state to the first state.

2. A method as claimed in claim 1 in which the bales are sequentially engaged by and picked up from the ground by the transfer means as the transporter is urged in a direction parallel to the direction of normal forward motion of the transporter.

3. A bale transporter comprising:
a chassis extending between a forward end and a rearward end and defining
an elongated first bale carrier,
the chassis being supported on at least a pair of rotatably mounted ground engaging wheels spaced apart transversely relative to the direction of normal forward motion of the transporter,
an elongated second bale carrier mounted on the chassis and moveable between a first state adjacent the first bale carrier and a second state spaced apart upwardly above the first bale carrier, and
a transfer means configured to pick up bales from the ground with the bales in the transfer means in an aligned state, and to transfer the bales in the aligned state onto a selected one of the first and second bale carriers, the transfer means comprising:
an elongated first bale engaging member, and
an elongated second bale engaging member spaced apart from the first bale engaging member, the first and second bale engaging members extending longitudinally and substantially parallel to the direction of normal forward motion of the transporter, and defining a bale accommodating opening therebetween for accommodating a portion of a bale resting on the ground therebetween as the bale is being captured by the transfer means.

4. A bale transporter as claimed in claim 3 in which the second bale carrier is configured in the second state to be spaced apart above the first bale carrier a distance for accommodating bales on the first bale carrier beneath the second bale carrier.

5. A bale transporter as claimed in claim 3 in which a first urging means is provided for urging the second bale carrier between the first state and the second state.

6. A bale transporter as claimed in claim 3 in which the second bale carrier extends substantially the length of the chassis.

7. A bale transporter as claimed in claim 3 in which the transfer means is pivotally coupled to the chassis about a first pivot axis extending substantially parallel to the direction of normal forward motion of the transporter, and is urgeable about the first pivot axis from a first state for engaging and picking up bales on the ground to a second state for transferring the bales onto a selected one of the first and second bale carriers.

8. A bale transporter as claimed in claim 3 in which the transfer means is configured to retain the bales on the first and second bale carriers during transportation thereof.

9. A bale transporter as claimed in claim 3 in which the first and second bale engaging members extend substantially the length of the chassis.

10. A bale transporter as claimed in claim 3 in which the first and second bale engaging members of the transfer means extend between a pair of spaced apart end elements, one of the end elements being located adjacent a forward end of the first and second bale engaging members, and the other one of the end elements being located adjacent a rearward end of the first and second bale engaging members, at least one of the end elements being configured to accommodate a bale resting on the ground therethrough.

11. A bale transporter as claimed in claim 3 in which the first bale carrier is configured to carry two rows of the bales with the bales of each row in the aligned state and with the respective rows extending parallel to each other and being adjacent each other, and the second bale carrier is configured to carry two rows of the bales with the bales of each row in the aligned state and with the rows extending parallel to each other and being adjacent each other.

12. A bale transporter as claimed in claim 11 in which a pair of transfer means are located on respective opposite sides of the chassis.

13. A bale transporter as claimed in claim 3 in which the first bale carrier extends substantially the length of the chassis.

14. A bale transporter as claimed in claim 3 in which the transporter is configured for transporting cylindrical bales.

15. A bale transporter
as claimed in claim 3 in which a first retaining means is provided for retaining the transfer means in the second state.

16. A bale transporter as claimed in claim 15 in which the first retaining means comprises a retaining member pivotally mounted on the chassis between a retaining state for retaining the transfer means in the second state, and a release state for releasing the transfer means from the second state.

17. A bale transporter comprising:
a chassis extending between a forward end and a rearward end and defining
an elongated first bale carrier,
the chassis being supported on at least a pair of rotatably mounted ground engaging wheels spaced apart transversely relative to the direction of normal forward motion of the transporter,
an elongated second bale carrier mounted on the chassis and moveable between a first state adjacent the first bale carrier and a second state spaced apart upwardly above the first bale carrier,
a transfer means configured to pick up bales from the ground with the bales in the transfer means in an aligned state, and to transfer the bales in the aligned state onto a selected one of the first and second bale carriers, and
a discharge means mounted on the chassis for discharging a bale on the first bale carrier therefrom, and for discharging a bale on the second bale carrier therefrom when the second bale carrier is in the first state.

18. A bale transporter as claimed in claim 17 in which the discharge means is co-operable with the transfer means for discharging a bale from each of the first and second bale carriers.

* * * * *